United States Patent Office 3,560,486
Patented Feb. 2, 1971

3,560,486
PREGNANE DERIVATIVES
Arthur F. Marx and Dirk van der Sijde, Delft, Netherlands, assignors to Koninklijke Nederlandsche Gist- en Spiritusfabriek N.V., Delft, Netherlands
No Drawing. Filed Mar. 13, 1968, Ser. No. 712,600
Claims priority, application Netherlands, Mar. 13, 1967, 6703781
Int. Cl. C07c 173/00
U.S. Cl. 260—239.55
71 Claims

ABSTRACT OF THE DISCLOSURE

New 14α,17α-methylenedioxypregnane derivatives are provided wherein atoms 14 and 17 of the steroid skeleton are bridged by one carbon and two oxygen atoms, arranged in such a way that they form a 1,3-dioxane ring system with carbon atoms 13, 14 and 17 of the steroid skeleton.

BACKGROUND OF INVENTION

This invention relates to new therapeutically useful steroids of the pregnane series, to processes for their preparation and to pharmaceutical compositions containing them.

SUMMARY OF THE INVENTION

According to the present invention there are provided the new 14α,17α-methylenedioxypregnane derivatives of the general formulae

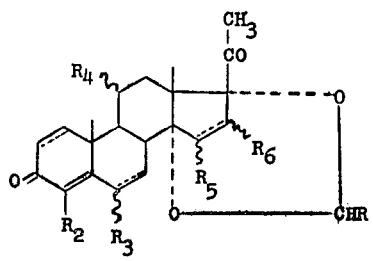

(I)

and

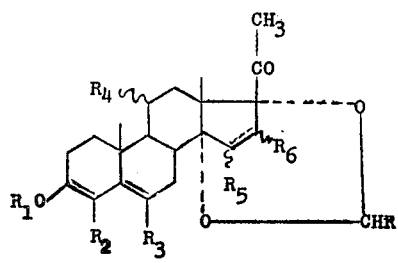

(II)

in which the dotted lines in the positions 1-2, 6-7, and 15-16 indicate, as is conventional, the optional presence of a double bond, and wherein:

R represents a straight or branched chain aliphatic hydrocarbon, preferably an alkyl group, which has less than 10 carbon atoms and which may be substituted by a substituent selected from halogen, preferably chlorine atoms, carboxyl or methoxy-carbonyl groups; or an aryl, preferably phenyl or naphthyl group, which aryl group may be substituted, preferably in the para-position, by a substituent selected from halogen atoms, lower alkyl, nitro and amino groups and one or more lower alkoxy groups; or an aryl-lower-alkyl group, a cycloalkyl, preferably cyclohexyl group, containing from 3 to 8 carbon atoms, a lower alkoxy group or the furyl group;

$R_1$ represents a lower alkyl group;

$R_2$ represents a hydrogen or halogen, preferably chlorine or a hydroxyl group;

$R_3$ represents a hydrogen or halogen atom or a lower alkyl, preferably a methyl group;

$R_4$ represents a hydrogen atom, an α-hydroxyl group, a free or acylated β-hydroxyl group or a keto group, and $R_5$ and $R_6$ are the same or different and each represents a hydrogen or halogen atom, a β-hydroxyl or a methyl group.

Substituted aryl groups and substituted alkyl groups include alkyl and aryl groups having more than one substituent selected from the groups set forth above, and include particularly alkyl and aryl groups having two and having three of said substituents.

The terms "lower alkyl" and "lower alkoxy" as employed herein include both straight and branched chain radicals of less than 5 carbon atoms.

As will be apparent from the structure of compounds I and II, carbon atoms 14 and 17 of the steroid skeleton are bridged by one carbon and two oxygen atoms, which are arranged in such a way that they form a 1,3-dioxane ring system with the carbon atoms 14, 13 and 17 of the steroid skeleton.

The pregnane derivatives of the general Formulae I and II are therapeutically active compounds possessing progestational activity. Some of these compounds are particularly useful in the treatment of threatened abortus, of dysmenorrhoea or for healing the mucous membrane of the uterus. Moreover, many of these compounds have excellent contraceptive properties. These compounds give, in many cases a remarkably long lasting protection against conception. Therefore, they may be applied as long acting contraceptives, preferably in combination with an oestrogenic compound.

DESCRIPTION OF THE PREFERRED
EMBODIMENTS

Particularly, in the group of compounds of the general Formula I, wherein R represents a straight or branched chain alkyl group of less than 6 carbon atoms, a phenyl or a para-substituted phenyl group, or a methoxy group, and wherein the other symbols, $R_2$-$R_6$ represent a hydrogen atom or are as hereinbefore defined, many compounds were found to have strong progestational activity and/or to possess outstanding contraceptive properties.

The toxicity of the compounds according to the invention is very low; the LD 50, measured in mice, is in most cases at least 1000 mg./kg. and often even considerably higher.

The 14α,17α-methylenedioxypregnane derivatives of the general Formulae I and II may be prepared by methods known for the preparation of analogous compounds.

According to a feature of the invention, the pregnane derivatives of the general Formula I are prepared by reacting a 14α,17α-dihydroxypregnane derivative of general Formula III

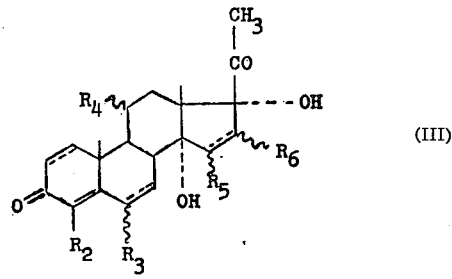

(III)

wherein the symbols $R_2$-$R_6$ are as hereinbefore defined, with an aldehyde of the general formula RCHO or its acetal of the general formula $RCH(OR_8)_2$, wherein R is as hereinbefore defined and $R_8$ represents a lower alkyl group.

In a modification of this process a 14α,17α-dihydroxypregnane derivative of the general Formula III wherein the 1-2 and 6-7 positions are saturated and the symbols $R_2$-$R_6$ are as hereinbefore defined, is reacted with an orthoformate of the general formula $(R_1O)_3CH$, wherein $R_1$ is as hereinbefore defined, thereby obtaining a 14α,17α-methylenedioxy pregnane derivative of the general Formula II. As will be apparent from the foregoing description the symbols $R_1$ and R in the compound obtained according to this modified process are always identical.

Preferably the reaction of a 14α,17α-dihydroxypregnane derivative III with an aldehyde of the formulae RCHO or with an orthoformate of the formula $$(R_1O)_3CH$$

is carried out at room temperature in the presence of a strong acid as catalyst and, if desired, in an inert organic medium (Chem. & Ind., London (1961), 465). In case an acetal of the formula $RCH(OR_8)_2$ is employed, it has been found suitable to conduct the reaction at a temperature between 20° C. and 100° C., whereby the lower alcohol is distilled off as it is formed during the reaction, if necessary, under reduced pressure (Tetrahedron Letters (1961), 448).

Prefered catalysts are perchloric acid, p-toluene sulfonic acid, sulfuric acid and hydrochloric acid. Also suited are Lewis acids, such as $BF_3$ etherate, or salts, such as $CuSO_4$ or $ZnCl_2$ (J. Chem. Soc. (1960), 2792; J. Org. Chem. 25 (1961), 516). Suitable solvents are halogenated alkanes, methyl acetate, ethyl acetate, dioxane, tetrahydrofurane, benzene and dimethylformamide.

Pregnane derivatives of Formula II may also be prepared by reacting, in manner known per se, a 14α,17α-methylenedioxypregnane of Formula I wherein the 1-2 and 6-7 positions are saturated, with an alcohol $R_1OH$, wherein $R_1$ is as hereinbefore defined, in the presence of a catalyst, such as p-toluene sulfonic acid (J. Org. Chem. 18 (1953), 1166). Alternatively, instead of an alcohol $R_1OH$, an orthoformate $(R_1O)_3CH$ may be employed, the reaction being carried out in the presence of a strong acid, such as hydrochloric acid or p-toluene sulphonic acid (Ber. 71 (1938), 1966; J. Org. Chem. 27 (1962) 668, or a dialkoxypropane, $CH_3C(OR_1)_2CH_3$, such as 2,2-dimethoxy-propane may be employed, the reaction being conducted in methanol dimethylformamide in the presence of a catalyst, such as p-toluene sulfonic acid (J. Org. Chem. 26 (1961), 3925)).

The pregnane derivatives of Formula II obtained according to one of the processes described hereinabove, may be converted into the corresponding pregnane derivatives of the Formula I wherein 1-2 and 6-7 positions are saturated, by methods known per se, for example under the influence of a small amount of a strong acid, such as p-toluene sulfonic acid.

According to another feature of the invention a 14α,17α-methylenedioxy pregnane having the Formula I or II wherein at least one of the symbols $R_2$, $R_3$, $R_4$, $R_5$ or $R_6$ represents a hydrogen atom and/or wherein at least one of the positions which may contain an optional double bond is saturated, is converted into another derivative of 14α,17α-methylenedioxy pregnane of Formula I or II by replacing at least one of the hydrogen atoms at the positions 4, 6, 11, 15 or 16 by an appropriate substituent and/or by introducing a double bond in at least one of the indicated positions which may contain an optional double bond, in a manner known per se for analogous conversions. In case the symbol R in Formula I or II represents an alkoxy group, acidic conditions should be avoided during these conversions, as the 14α,17α-methylenedioxy bridge is then decomposed.

A 6-methyl group may be introduced into a 14α,17α-methylenedioxypregnane derivative of structure II wherein the 6-position is not substituted, by converting the compound, or a 3-acyl derivative of the corresponding 3-enol thereof, with a Vilsmeier-Haack reagent into the corresponding 6-formyl derivative. The 6-methyl-14α,17α-methylenedioxypregnane of Formula I, wherein the 1-2 and 6-7 positions are saturated, as then obtained by catalytic reduction of this 6-formyl derivative (Tetrahedron Suppl. No. 7 (1966), 325).

In similar manner, a halogen atom may be introduced at the 6-position by reacting a 14α,17α-methylenedioxypregnane derivative of the Formula II wherein the symbol $R_3$ represents a hydrogen atom, with a N-halogeno-imide, such as N-chlorosuccinimide, or with perchlorylfluoride (J.A.C.S. 81 (1959), 5259 and 77 (1955), 3826; Chem. & Ind. (1959), 1317).

According to another process, a fluorine atom may be introduced at the 6-position by converting a 14α,17α-methylenedioxypregnane derivative of the Formula II wherein the symbol $R_3$ represents a hydrogen atom, into a 3-acyl derivative of the corresponding 3-enol thereof and hydrogenating this 3-acyl derivative, for example with sodium borohydride, and reacting the resultant corresponding 3-hydroxy-5-dehydro compound with a mixture of a N-bromocarboxyl amide or imide and hydrogen fluoride. (J.A.C.S. 81 (1959), 4107). The 3-hydroxy-5-bromo-6-fluoro derivative thus formed is converted by oxidation into the desired 6-fluoro-14α,17α-methylenedioxypregnane of Formula I, wherein the 1-2 and 6-7 positions are saturated. This oxidation may be conducted according to Oppenauer (Organic Reactions 6 (1951), 207; J.A.C.S. 75 (1953), 422 and 4377 and 74 (1952), 3309). The oxidation can also be achieved microbiologically, for example utilizing a culture of *Flavobacterium dehydrogenans* (Tetrahedron Leters (1960), 21), in the usual manner.

Depending on the starting material and the reaction conditions, the 6-substituted compounds obtained have an α- or a β-configuration. On treatment in acidic medium a compound with 6β-configuration generally is isomerized into the corresponding compound with 6α-configuration.

Pregnane derivatives of the Formula I, wherein the 6-7 position is saturated, can be converted into the corresponding 6-hydro derivatives in known manner, for example with chloranil or 2,3-dichloro-5,6-dicyanobenzoquinone. In the case chloranil is used, the reaction is preferably carried out in a solvent boiling between 30° C. and 150° C. (J.A.C.S. 81 (1959), 5991 and 82 (1960), 4293). Suitable solvents are for example: ethanol, tert-butanol, tert-pentanol, methyl acetate, ethyl acetate, dioxane, tetrahydrofuran, glacial acetic acid, benzene and acetone. Using 2,3-dichloro-5,6-dicyanobenzoquinone the same solvents can be applied; it is preferred to carry the reaction out in the presence of a strong acid, such as p-toluene sulfonic acid (Chem. & Ind. (1962), 211).

Pregnane derivatives of the Formula I wherein the 1-2 position is saturated, can be converted into the corresponding 1-dehydroderivatives according to the usual chemical or microbiological processes. Particularly, 2,3-dichloro-5,6-dicyanobenzoquinone and selenium oxide are appropriate dehydrogenating agents.

The 1,2-dehydrogenation with 2,3-dichloro-5,6-dicyanobenzoquinone can be carried out in the same solvents as used in the 6,7-dehydrogenation with chloranil. It is advisable to add a small amount of nitrophenol to the reaction mixture. The reaction takes place in 3 to 48 hours, dependent on the solvent and starting material used. The conversion is preferably conducted at the boiling temperature of the solution (Proc. Chem. Soc. (1960), 14).

Using selenium oxide, tert-butanol, ethyl acetate or tert-butanol have been found to be most suitable solvents. The reaction is accelerated by addition of small amounts of glacial acetic acid and is preferably carried out at the boiling temperature of the solution. The reaction is completed within 10 to 48 hours (J.A.C.S. 81 (1959), 1235 and 5991). The microbiological 1,2-dehydrogenation can be carried out too by using appropriate microorganisms, such as *Corynebacterium simplex* (J.A.C.S. 77 (1955), 4184), *Bacillus sphaericus* (Arch Bioch. 59 (1955), 304) and *Fusarium solani* (Helv. Chim. Acta 38 (1953), 835). The starting material is added to a submerged culture of the utilized microorganism, which is grown in a suitable nutrient medium at an optimal temperature with strong aeration. Instead of this fermentation culture, suspensions of the microorganisms in buffered solutions can be used too. The conversion is followed chromatographically and upon complete conversion of the starting materal of the fermentation fluid is extracted e.g. with dichloromethane.

The pregnane derivatives of the general Formula I wherein $R_4$ represents a hydrogen atom, can be converted into the corresponding 11α- or 11β-hydroxy compounds by means of microorganisms known for that purpose. In this respect, *Aspergillus ochraceus* (Mycologia 47 (1955), 464), *Rhizopus nigricans* (J.A.C.S. 75 (1953), 408) *Curvularia lunata* (J.A.C.S. 77 (1955), 763) and *Cunninghamella blakesleeana* (J.A.C.S. 75 (1953), 5369) have been found particularly suitable. The hydroxylation is carried out by adding the starting material, either suspended in water or dissolved in a suitable solvent, such as acetone or dimethyl formamide, to a submerged culture of the used microorganism, which is grown in a suitable nutrient medium at an optimal temperature with strong aeration. The conversion is followed chromatographically. Upon complete conversion of the starting material, the fermentation fluid is filtered and the filtrate is extracted, e.g. with methyl isobutyl ketone.

Into a pregnane derivative of Formula I wherein $R_2$ represents a hydrogen atom, a chlorine atom may be introduced at the 4-position, e.g. with sulfuryl chloride or isocyanuric acid chloride (Chem. Pharm. Bull. (Tokyo) 10 (1962), 427, Bull. Chem. Soc. Japan 33 (1960), 25).

According to another process, a pregnane derivative of Formula I wherein $R_2$ represents a hydrogen atom, is converted into the corresponding 4,5-epoxy compound, e.g. with hydrogen peroxide (Helv. Chim. Acta 31 (1948), 1822). This epoxy compound is then reacted with a hydrogen halide and the 4-halogeno - 5 - hydroxy derivative thus obtained is converted into the corresponding 4-halogeno - 4 - dehydro-pregnane derivative by splitting off 1 mol of water. In a modification of this process the desired 4-halogeno - 4 - dehydro compound is directly formed from the corresponding oxido-steroid (Can. J. Chem. 37 (1959), 1785; J. Chem. Soc. (1955), 3549: J. Org. Chem. 24 (1959), 1612).

The 4,5-epoxy-pregnane derivatives described above can also be used to obtain the corresponding 4-hydroxy-4-dehydropregnanes of the Formula I, for example with borotrifluoride or sulfuric acid (J. Chem. Soc. (1959), 3919, Helv. Chim. Acta 45 (1962), 2575).

When preparing 14α,17α-methylenedioxypregnane derivatives of Formulae I and II from the corresponding 14α,17α-dihydroxy compounds of the Formula III, theoretically speaking, a mixture of two stereo-isomers could be expected, since bridging the 14α- and 17α-oxygen atoms by a substituted methylene group introduces a new asymmetric carbon atom. However, the occurrence of these two stereo-isomers has so far not been demonstrated. The data of paper and t.l. chromatography, the melting points and optical rotations and the N.M.R. spectra of the products never indicate the presence of a mixture of two stereo-isomers. Sterical hindrance could be the reason that one of the two theoretically possible isomers has not been formed.

Typical compounds according to the present invention of Formula I are:

14α,17α-ethylidenedioxyprogesterone,
4-fluoro-14α,17α-ethylidenedioxyprogesterone,
4-chloro-14α,17α-ethylidenedioxy-1-dehydroprogesterone,
4-chloro-14α,17α-ethylidenedioxy-1,6-bisdehydroprogesterone,
4-fluoro-14α,17α-ethylidenedioxy-6-dehydroprogesterone,
4-hydroxy-14α,17α-ethylidenedioxy-progesterone,
6-chloro-14α,17α-ethylidenedioxy-1-dehydroprogesterone,
6-chloro-14α,17α-ethylidenedioxy-1,6-bisdehydroprogesterone,
6-fluoro-14α,17α-ethylidenedioxy-6-dehydroprogesterone,
6-methyl-14α,17α-ethylidenedioxy-1-dehydroprogesterone,
6-methyl-14α,17α-ethylidenedioxy-1,6-bisdehydroprogesterone,
11β-hydroxy-14α,17α-ethylidenedioxyprogesterone,
11α-hydroxy-14α,17α-ethylidenedioxyprogestrone,
11β-hydroxy-14α,17α-ethylidenedioxy-6-dehydroprogesterone,
11β-hydroxy-14α,17α-ethylidenedioxy-1,6-bisdehydroprogesterone,
15α-bromo-14α,17α-ethylidenedioxy-progesterone,
15α-chloro-14α,17α-ethylidenedioxy-progesterone,
15β-fluoro-14α,17α-ethylidenedioxy-1-dehydroprogesterone,
15β-hydroxy-14α,17α-ethylidenedioxy-progetsrone,
16β-methyl-14α,17α-ethylidenedioxy-progesterone,
16β-methyl-14α,17α-ethylidenedioxy-6-dehydroprogesterone,
16-methyl-14α,17α-ethylidenedioxy-15-dehydroprogesterone,
6β-fluoro-16α-methyl-14α,17α-ethylidenedioxyprogesterone,
6-fluoro-16α-methyl-14α,17α-ethylidenedioxy-1-dehydroprogesterone,
6-chloro-16-methyl-14α,17α-ethylidenedioxy-15-dehydroprogesterone,
6,16-dimethyl-14α,17α-ethylidenedioxyprogesterone,
6β-chloro-15β-chloro-16α-methyl-14α,17α-ethylidenedioxyprogesterone,
6β-chloro-15β-bromo-16α-methyl-14α,17α-ethylidenedioxyprogesterone,
14α,17α-propylidenedioxyprogesterone,
14α,17α-(2'-chloropropylidenedioxy)progesterone,
14α,17α-(3'-carboxypropylidenedioxy)progestrone,
14α,17α-(2'-butenylidenedioxy)progesterone,
14α,17α-hexylidenedioxyprogestrone,
14α,17α-nonylidenedioxyprogesterone,
14α,17α-cyclohexylmethylenedioxyprogesterone,
14α,17α-benzylidenedioxyprogesterone,
14α,17α-(p-bromobenzylidenedioxy)progesterone,
14α,17α-(p-isobutylbenzylideneioxy)progesterone,
14α,17α-(p-ethoxybenzylidenedioxy)progesterone,
14α,17α-(2'napthylmethylenedioxy)progesterone,
14α,17α-methoxymethylenedioxy-1-dehydroprogesterone,
14α,17α-ethoxymethylenedioxy-1,6-dehydroprogesterone.

Typical compounds according to the present invention of Formula II are:

3-ethoxy-14α,17α-ethylidenedioxy-3,5-pragnadien-20-one,
3-ethoxy-6-bromo-14α,17α-ethylidenedioxy-3,5-pregnadien-20-one,
3-ethoxy-15α-chloro-14α,17α-ethylidenedioxy-3,5-pregnadien-20-one,
3-ethoxy-6-chloro-16α-methyl-14α,17α-ethylidenedioxy-3,5-pregnadien-20-one.
3-ethoxy-14α,17α-propylidenedioxy-3,5-pregnadien-20-one,
3-methoxy-14α,17α-methoxymethylenedioxy-3,5-pregnadien-20-one.

The 14α,17α-dihydroxypregnane derivatives of the general Formula III which are used as starting materials in the processes of the invention described hereinbefore, can be obtained by a microbiological process from the corresponding 17α-hydroxypregnanes. For this process, microorganisms that are capable of introducing a hydroxyl group at the 14-position are used. Various strains of the genera Curvularia and Helicostylum, particularly the strains *Curvularia lunata* and *Absidia regnieri*, have been found to be very suitable in this respect (Dutch pat. appl. 6509006).

The 14α,17α-dihydroxypregnane derivatives of the general Formula III can also be prepared from Riechstein's compound S, i.e. 17α,21-dihydroxy-4-pregnane-3,20-dione, by microbiological conversion of this compound, e.g. with *Curvularia lunata*, into 14α,17α, 21-trihydroxy-4-pregnane-3,20-dione, followed by reductive removal of the 21-hydroxyl group (Tetrahedron Suppl. No. 7 (1966), 325). The 14α,17α-dihyroxy-4-pregnane-3,20-dione thus obtained may be converted into other pregnane derivatives of Formula III in a manner known per se, f.i. making use of one or more of the processes described hereinbefore for the introduction of substituents in, and/or the dehydrogenation of 14α,17α-methylenedioxypregnanes of Formulae I and II.

EXAMPLE 1

(a) 2.5 g. of 14α,17α-dihydroxyprogesterone was suspended in a mixture of 50 ml. of acetaldehyde and 0.25 ml. of perchloric acid (70%); the suspension was stirred at room temperature. The steroid was completely dissolved within 1 hour. To the reaction mixture 150 ml. of methyl isobptyl ketone was added; the solution was neutralized with a solution of 1.5 g. of sodium bicarbonate in 30 ml. of water. This solution was washed three times with 20 ml. of water and the solvent was completely removed by distillation under reduced pressure.

The residue was crystallized from a mixture of 20 ml. of acetone and 20 ml. of water. The crystalline product was recrystallized from a mixture of 15 ml. of acetone and 15 ml. of water. Yield: 2.0 g. of 14α,17α-ethylidenedioxyprogesterone. Melting point 178°–181° C.;

$[\alpha]_D = +184°$ (c.=0.5 in CHCl$_3$)

$\lambda_{max}$ (in CH$_3$OH) = 241 m$\mu$, $E^{1\%}_{1\,cm.}$ 428

I.R. (in CHCl$_3$) $\nu_{max}$: (no OH) 1712, 1667, 1615, 1355 and 1113 cm.$^{-1}$.

N.M.R. (in CDCl$_3$) $\delta$: 0.83, 1.19, 1.36 (doublet), 2.17, 5.16 (quadruplet), 5.74 p.p.m.

*Elementary analysis.*—Calculated for C$_{23}$H$_{32}$O$_4$ (percent): C, 74.16; H, 8.66. Found (percent): C, 74.15 and 74.12; H, 8.75 and 8.68.

(b) 2.5 g. of 14α,17α-dihydroxyprogesterone was suspended in a mixture of 50 ml. of acetaldehyde and 0.1 ml. of boron trifluride etherate; the suspension was stirred at room temperature. Within 2.5 hr. the steroid was completely dissolved. The reaction mixture was worked up as described (subexample Ia). Yield: 1.9 g. of 14α,17α-ethylidenedioxyprogesterone; melting point 178°–181° C.; $[\alpha]_D = +185°$ (c.=1.0 in CHCl$_3$).

EXAMPLE 2

(a) To a suspension of 25 g. of 14α,17α-dihydroxyprogesterone in 450 ml. of paraldehyde 2.2 ml. of perchloric acid (70%) was added with stirring; the reaction mixture was stirred at room temperature. The steroid was completely dissolved with 1 hr. To the reaction mixture 1.9 l. of methyl isobutyl ketone was added. The solution was neutralized by shaking with a solution of 75 g. of sodium bicarbonate in 300 ml. of water. The methyl isobutyl ketone solution was washed three times with 200 ml. of water. The solvent was partly removed by distillation under reduced pressure. The crystalline product was filtered and washed with methyl isobutyl ketone. 24 g. of 14α,17α - ethylidenedioxyprogesterone was obtained. Melting point: 178°–181° C.; $[\alpha]_D = +185°$ (c.=1.0 in CHCl$_3$).

(b) Similarly, 6α - methyl-14α,17α-dihydroxyprogesterone was converted to 6α-methyl-14α,17α-ethylidenedioxyprogesterone. Melting point: 154°–155.0° C.;

$[\alpha]_D = +160°$ (c.=0.5; in CHCl$_3$), $\lambda_{max}$ (in CH$_3$OH) = 240 m$\mu$, $E^{1\%}_{1\,cm.}$ 380

I.R. (in CHCl$_3$) $\nu_{max}$=1710, 1662, 1609, 1358 and 1118 cm.$^{-1}$ (no OH).

N.M.R. (in CDCl$_3$) $\delta$: 0.83, 1.07 (doublet), 1.16, 1.35 (doublet), 2.15, 5.16 (quadruplet), 5.79 p.p.m.

*Elementary analysis.*—Calculated for C$_{24}$H$_{34}$O$_4$ (percent): C, 74.61; H, 8.81. Found (percent): C, 74.68 and 74.70; H, 8.72 and 8.74.

(c) In a similar way 6α-chloro-14α,17α-dihydroxyprogesterone was converted to 6α-chloro-14α,17α-ethylidenedioxyprogesterone. Melting point 88° C.–92° C. and 143° C.–145° C.; $[\alpha]_D = +145°$ (c.=0.5, in CHCl$_3$);

$\lambda_{max}$ (in CH$_3$OH) = 236 m$\mu$, $E^{1\%}_{1\,cm.}$ 361

I.R. (in CHCl$_3$) $\nu_{max}$: (no OH) 1712, 1673, 1620, 1359, 1116 cm.$^{-1}$.

N.M.R. (in CDCl$_3$) $\delta$: 0.85, 1.21 (doublet), 2.16, 5.16 (quadruplet), 6.40 (triplet) p.p.m.

*Elementary analysis.*—Calculated for C$_{23}$H$_{31}$O$_4$Cl (percent): C, 67.90; H, 7.63; Cl, 8.73. Found (percent): C, 67.78 and 67.83; H, 7.77 and 7.79; Cl, 8.88 and 8.79.

(d) In an analogous way 15β-fluoro-14α,17α-dihydroxyprogesterone was converted to 15β-fluoro-14α,17α-ethylidenedioxyprogesterone. Melting point: 192° C.–199° C.; $[\alpha]_D = +324°$ (c.=0.5, in CHCl$_3$), $\lambda_{max}$ (in CH$_3$OH) = 239 m$\mu$, $E^{1\%}_{1\,cm.}$ 459

I.R. (in CHCl$_3$) $\nu_{max}$: (no OH), 1711, 1661, 1622, 1355, 1121 cm.$^{-1}$.

N.M.R. (in CDCl$_3$) $\delta$: 0.90, 1.17 (doublet), 1.32, 2.16, 4.50 (multiplet), 5.12 (quadruplet). 5.80 p.p.m.

*Elementary analysis.*—Calculated for C$_{23}$H$_{31}$O$_4$F (percent): C, 70.77; H, 7.95. Found (percent): C, 70.98 and 70.93; H, 8.00 and 7.96.

(e) In an analogous way 15β - chloro - 14α,17α - dihydroxyprogesterone was converted to 15β-chloro-14α,17α-ethylidenedioxyprogesterone. Melting point: 258° C.–261° C.; $[\alpha]_D = +83°$ (c.=0.5, in CHCl$_3$), $\lambda_{max}$ (in CH$_3$OH) = 240 m$\mu$, $E^{1\%}_{1\,cm.}$ 419

I.R. (in CHCl$_3$) $\nu_{max}$: (no OH), 1712, 1665, 1617, 1356 and 1112 cm.$^{-1}$.

N.M.R. (in CDCl$_3$) $\delta$: 1.10, 1.31 (doublet), 1.23, 2.18, 4.40 (multiplet), 5.0 (quadruplet), 5.76 p.p.m.

*Elementary analysis.*—Calculated for C$_{23}$H$_{31}$O$_4$Cl (perment): C, 67.90; H, 7.63; Cl, 8.73. Found (percent): C, 67.73 and 67.79; H, 7.75 and 7.75; Cl, 8.78 and 8.71.

(f) In an analogous way 15β - bromo - 14α,17α-dihydroxyprogesterone was converted to 15β-bromo-14α,17α-ethylidenedioxyprogesterone. Melting point: 239° C.–240° C.; $[\alpha]_D = +31°$ (c.=0.5, in CHCl$_3$), $\lambda_{max}$ (in CH$_3$OH) = 240 m$\mu$, $E^{1\%}_{1\,cm.}$ 373

I.R. (in CHCl$_3$) $\nu_{max}$: (no OH), 1712, 1665, 1615, 1356 and 1121 cm.$^{-1}$.

N.M.R. (in CDCl$_3$) $\delta$: 1.16, 1.23, 1.38 (doublet), 2.17, 4.40 (multiplet), 5.04 (quadruplet), 5.75 p.p.m.

*Elementary analysis.*—Calculated for C$_{23}$H$_{31}$O$_4$Br (percent): C, 61.20; H, 6.87; Br, 17.74. Found (percent): C, 61.03 and 61.11; H, 6.96 and 6.98; Br, 17.83 and 17.90.

(g) In an analogous way 6α-fluoro-16α-methyl-14α,17α-dihydroxyprogesterone was converted in 6α - fluoro - 16α-methyl - 14α,17α - ethylidenedioxyprogesterone. Melting point: 214° C.–216.5° C.; $[\alpha]_D = +150°$ (c.=0.5, in CHCl$_3$), $\lambda_{max}$ (in CH$_3$OH) = 236 m$\mu$, $E^{1\%}_{1\,cm.}$ 375

I.R. (in CHCl$_3$) $\nu_{max}$: (no OH), 1710, 1683, 1629, 1355, 1109 cm.$^{-1}$.

N.M.R. (in CDCl$_3$) $\delta$: 0.88, 1.05 (doublet), 1.19, 1.39 (doublet), 2.15, 5.25 (quadruplet), 6.10 p.p.m.

*Elementary analysis.*—Calculated for C$_{24}$H$_{33}$O$_4$F (percent): C, 71.29; H, 8.17. Found (percent): C, 71.16 and 71.24; H, 8.39 and 830.

(h) In analogous way 6α-fluoro-15β-chloro-16α-methyl-14α,17α - dihydroxyprogesterone was converted to 6α- fluoro-15β-chloro-16α-methyl - 14α,17α - ethylidenedioxyprogesterone. Melting point: 228° C.–229° C.

$[\alpha]_D = +68°$ (c.=1.0, in CHCl$_3$), $\lambda_{max}$ (in methanol) = 235 m$\mu$, $E_{1\,cm.}^{1\%}$ 374

I.R. (in CHCl$_3$) $\nu_{max}$=1712, 1682, 1669, 1625, 1359, 1120 cm.$^{-1}$ (no OH).

N.M.R. (in CDCl$_3$) δ: 1.11, 1.22, 1.14 (doublet), 2.15, 3.38 (multiplet), 4.07 (doublet), 5.10 (quadruplet), 6.10 p.p.m.

*Elementary analysis.*—Calculated for C$_{24}$H$_{32}$O$_4$FCl (percent): C, 65.67; H, 7.35. Found (percent): C, 65.59 and 65.55; H, 7.39 and 7.39.

(i) In an analogous way 6α-fluoro - 15β-bromo-16α-methyl-14α,17α-dihydroxyprogesterone was converted to 6α-fluoro-15β-bromo - 16α - methyl - 14α,17α - ethylidenedioxyprogesterone. Melting point: 218° C.–219° C., $[\alpha]_D = +26°$ (c.=1.0, in CHCl$_3$)

$\lambda_{max}$ (in methanol) = 234 m$\mu$, $E_{1\,cm.}^{1\%}$=349

I.R. (in CHCl$_3$) $\nu_{max}$=1710, 1680, 1665, 1622, 1356 and 1117 cm.$^{-1}$ (no OH).

N.M.R. (in CDCl$_3$) δ: 1.12 (doublet), 1.18, 1.23, 1.41 (doublet), 2.16, 3.54 (multiplet), 4.11 (doublet), 5.13 (quadruplet), and 6.10 p.p.m.

*Elementary analysis.*—Calculated for C$_{24}$H$_{32}$O$_4$FBr (percent): C, 59.63; H, 6.67. Found (percent): C, 59.43, and 59.38; H, 6.64 and 6.60.

(j) In an analogous way 6α-fluoro-16α-methyl-14α,15β,17α-trihydroxyprogesterone was converted to 6α-fluoro-16α-methyl-15β-hydroxy - 14α,17α - ethylidenedioxyprogesterone. Melting point: 246° C.–248° C.; $[\alpha]_D = +92.5°$ (c.=1, in CHCl$_3$);

$\lambda_{max}$ (in methanol) = 235 m$\mu$, $E_{1\,cm.}^{1\%}$ 361

I.R. (in CHCl$_3$) $\nu_{max}$: 3620, 1712, 1683, 1670, 1627, 1360, 1162, 1150 and 1119 cm.$^{-1}$.

N.M.R. (in CDCl$_3$) δ: 1.04, 1.08 (doublet), 1.20, 1.38 (doublet), 2.15, 2.92 (doublet), 3.0–3.25 (multiplet), 4.05 (multiplet), 4.97 (quadruplet), 6.10 p.p.m.

*Elementary analysis.*—Calculated for C$_{24}$H$_{33}$O$_5$F (percent): C, 68.55; H, 7.91. Found (percent): C, 68.48 and 68.41; H, 8.07 and 8.01.

EXAMPLE 3

(a) 12 g. of 14a,17α-dihydroxyprogesterone was suspended in a mixture of 60 ml. of benzaldehyde and 0.3 ml. of perchloric acid (70%). The suspension was stirred for 1.5 hr. at room temperature and another portion of 0.3 ml. of perchloric acid (70%) was added. After standing for 2.5 hr. 300 ml. of ethylacetate was added. The solution was washed three times with 30 ml. of water and then vigorously stirred with 300 ml. of a solution of 240 g. of sodium metabisulfite in 480 ml. of water.

The crystalline sodium bisulfite compound of benzaldehyde was filtered off and washed with 400 ml. of ethylacetate. The ethylacetate layer of the filtrate was successively washed with 100 ml. of sodium bisulfite solution (two times) and with 60 ml. of water (three times). The solvent was distilled off under reduced pressure; the crytalline residue was crystallized from a mixture of 400 ml. of methanol and 200 ml. of water.

Obtained was 11.5 g. of 14α,17α-benzylidenedioxyprogesterone; melting point 182.5° C.–185.5° C.;

$[\alpha]_D = +160°$ (c.=0.5, in CHCl$_3$), $\lambda_{max}$ (in methanol) = 207 and 241 m$\mu$, $E_{1\,cm.}^{1\%}$ 286 respectively 361

I.R. (in CHCl$_3$) $\nu_{max}$: (no OH) 1715, 1668, 1620, 1452, 1360, 1020 cm.$^{-1}$.

N.M.R. (in CDCl$_3$) δ: 0.92, 1.08, 2.22, 5.74, 5.97, 7.5 (multiplet) p.p.m.

*Elementary analysis.*—Calculated for C$_{28}$H$_{34}$O$_4$ (percent): C, 77.39; H, 7.89. Found (percent): C, 77.19 and 77.21; H, 7.97 and 7.99.

(b) In an analogous way 14α,17α-dihydroxyprogesterone was converted with propanal to 14α,17α-propylidenedioxyprogesterone. Melting point: 93°–94° C.;

$[\alpha]_D = +165°$ (c.=1, in dioxane), $\lambda_{max}$ (in methanol) = 241 m$\mu$, $E_{1\,cm.}^{1\%}$ 433

I.R. (in CHCl$_3$) $\nu_{max}$: (no OH) 1711, 1667, 1616, 1358, 1100 cm.$^{-1}$.

N.M.R. (in CDCl$_3$) δ: 0.86, 0.97 (triplet), 1.19, 2.18, 4.94 (triplet), 5.75 p.p.m.

*Elementary analysis.*—Calculated for C$_{24}$H$_{34}$O (percent): C, 74.61; H, 8.81. Found (percent): C, 74.44 and 74.48; H, 8.90 and 8.93.

(c) In an analogous way 15β-chloro-14α,17α-dihydroxyprogesterone was converted with propanal to 15β-chloro-14α,17α - propylidenedioxyprogesterone. Melting point: 193.5° C.–196.5° C. $[\alpha]_D = +64°$ (c.=0.5; in CHCl$_3$), $\lambda_{max}$ (in CH$_3$OH) = 240 m$\mu$; $E_{1\,cm.}^{1\%}$ 419

I.R. (in CHCl$_3$) $\nu_{max}$: (no OH), 1714, 1669, 1618, 1356, 1100 cm.$^{-1}$.

N.M.R. (in CDCl$_3$) δ: 0.96 (triplet), 1.09, 1.23, 2.17, 4.36 (multiplet), 4.78 (triplet), 5.74 p.p.m.

*Elementary analysis.*—Calculated for C$_{24}$H$_{33}$O$_4$Cl (percent): C, 68.49; H, 7.85; Cl, 8.44. Found (percent): C, 68.13 and 68.07; H, 7.83 and 7.81; Cl, 8.77 and 8.70.

(d) In an analogous way 14α,17α-dihydroxyprogesterone was converted with n-pentanal to 14α,17α-pentylidenedioxyprogesterone. Melting point: 87.5° C.–89° C.; $[\alpha]_D = +152°$ (c.=1, in dioxane), $\lambda_{max}$ (in CH$_3$OH) = 241 m$\mu$, $E_{1\,cm.}^{1\%}$ 402

I.R. (in CHCl$_3$) $\nu_{max}$: (no OH), 1712, 1670, 1616, 1358, 1112 cm.$^{-1}$.

N.M.R. (in CDCl$_3$) δ: 0.85, 1.18, 2.16, 4.97 (triplet), 5.75 p.p.m.

*Elementary analysis.*—Calculated for C$_{26}$H$_{38}$O$_4$ (percent): C, 75.36; H, 9.18. Found (percent): C, 75.35 and 75.42; H, 9.30 and 9.33.

(e) In an analogous way 14α,17α-dihydroxyprogesterone was converted with n-octanal to 14α,17α-octylidenedioxyprogesterone. Syrupy oil: $[\alpha]_D = +184°$ (c.=1, in dioxane), $\lambda_{max}$ (in methanol) = 240 m$\mu$, $E_{1\,cm.}^{1\%}$ 362

I.R. (in CHCl$_3$) $\nu_{max}$: (no OH), 1710, 1664, 1613, 1355, 1119 cm.$^{-1}$.

N.M.R. (in CDCl$_3$) δ: 0.86, 1.18, 2.17, 4.90 (triplet), 5.77 p.p.m.

*Elementary analysis.*—Calculated for C$_{29}$H$_{44}$O$_4$ (percent): C, 76.31; H, 9.65. Found (percent): C, 76.10 and 76.09; H, 9.79 and 9.81.

(f) In an analogous way 14α,17α-dihydroxyprogesterone was converted with 2,2-dimethylpropanal to 14α,17α-(2',2' - dimethylpropylidenedioxy)progesterone. Melting point: 122° C.–125° C.; $[\alpha]_D = +155°$ (c.=1, in dioxane), $\lambda_{max}$ (in CH$_3$OH) = 240.5 m$\mu$, $E_{1\,cm.}^{1\%}$ 393

I.R. (in CHCl$_3$) $\nu_{max}$: 1710, 1663, 1613, 1388, 1375, 1353, 1108 cm.$^{-1}$.

N.M.R. (in CDCl$_3$) δ: 0.87, 0.97, 1.18, 2.17, 4.57, 5.75 p.p.m.

*Elementary analysis.*—Calculated for C$_{26}$H$_{38}$O$_4$ (percent): C, 75.36; H, 9.18. Found (percent): C, 75.44 and 75.40; H, 9.30 and 9.33.

(g) In an analogous way 14α,17α-dihydroxyprogesterone was converted with 2-ethylbutanal to 14α,17α-(2'-ethylbutylidenedioxy)progesterone. Melting point: 84° C.–86° C.; $[\alpha]_D = +160°$ (c.=1, in CHCl$_3$), $\lambda_{max}$ (in CH$_3$OH) = 240.5 m$\mu$, $E_{1\,cm.}^{1\%}$ 401

I.R. (in CHCl₃) $\nu_{max}$: (no OH): 1710, 1663, 1615, 1354, 1100 cm.⁻¹.

N.M.R. (in CDCl₃) δ: 0.86, 1.19, 2.18, 4.89 (multiplet), 5.78 p.p.m.

*Elementary analysis.*—Calculated for C₂₇H₄₀O₄ (percent): C, 75.66; H, 9.41. Found (percent): C, 75.52 and 75.45; H, 9.51 and 9.49.

(h) In an analogous way 14α,17α-dihydroxyprogesterone was converted with 2-butenal to 14α,17α-(2'-butenylidenedioxy)progesterone. Melting point: 119° C.–120° C.; [α]_D=+150° (c.=1, in CHCl₃), $\lambda_{max}$ (in CH₃OH) = 240.5 mμ, $E^{1\%}_{1cm.}$ 440

I.R. (in CHCl₃) $\nu_{max}$: (no OH); 1712, 1666, 1614, 1358, 1113 cm.⁻¹.

N.M.R. (in CDCl₃) δ: 0.85, 1.19, 1.78 (doublet), 2.18, 5.78, ~5.2–6.6 p.p.m.

*Elementary analysis.*—Calculated for C₂₅H₃₄O₄ (percent): C, 75.38; H, 8.54. Found (percent): C, 75.15 and 75.08; H, 8.55 and 8.53.

(i) 14α,17α-dihydroxyprogesterone was converted in an analogous way with 3-methoxycarbonylpropanal to 14α,17α - (3'-methoxycarbonylpropylidenedioxy) - progesterone. Syrupy oil; [α]_D=+134° (c.=0.5, in CHCl₃), $\lambda_{max}$ (in CH₃OH) = 241.5 mμ, $E^{1\%}_{1cm.}$ 334

I.R. (between NaCl) $\nu_{max}$: (no OH); 1740, 1712, 1673, 1615, 1167 cm.⁻¹.

N.M.R. (in CDCl₃) δ: 0.86, 1.20, 2.14, 3.67, 5.04 (triplet), 5.70 p.p.m.

*Elementary analysis.*—Calculated for C₂₆H₃₆O₆ (percent): C, 70.27; H, 8.11. Found (percent): C, 70.15 and 70.90; H, 8.17 and 8.15.

(j) Similarly 14α,17α-dihydroxyprogesterone was converted with 2-phenylpropanal to 14α,17α-(2'-phenylpropylidenedioxy)-progesterone. Melting point: 136° C.–138° C.; [α]_D=+181° (c.=1, in CHCl₃), $\lambda_{max}$ (in CH₃OH) = 209 and 241 mμ, $E^{1\%}_{1cm.}$ 279 respectively 350

I.R. (in CHCl₃) $\nu_{max}$: (no OH); 1711, 1665, 1615, 1492, 1450, 1356 cm.⁻¹.

N.M.R. (in CDCl₃) δ: 0.76, 1.13, 1.38 (doublet), 2.08, 4.97 (doublet), 5.74, 7.24 p.p.m.

*Elementary analysis.*—Calculated for C₃₀H₃₈O₄ (percent): C, 77.92; H, 8.23. Found (percent): C, 77.69; H, 8.18.

(k) In an analogous way 14α,17α-dihydroxyprogesterone was converted with 3-phenylpropanal to 14α,17α-(3'-phenylpropylidenedioxy)progesterone. Melting point: 153° C.–155° C. [α]_D=+132° (c.=1, in CHCl₃), $\lambda_{max}$ (in CH₃OH) = 209 and 241 mμ, $E^{1\%}_{1cm.}$ 267 respectively 336

I.R. (in CHCl₃) $\nu_{max}$: (no OH); 1710, 1663, 1612, 1354 cm.⁻¹.

N.M.R. (in CDCl₃) δ: 0.84, 1.17, 2.16, 4.97 (triplet), 5.75, 7.28 (multiplet) p.p.m.

*Elementary analysis.*—Calculated for C₃₀H₃₈O₄ (percent): C, 77.92; H, 8.23. Found (percent): C, 78.09 and 78.05; H, 8.33 and 8.28.

(l) In an analogous way 14α,17α-dihydroxyprogesterone was converted with hexahydrobenzaldehyde to 14α,17α - cyclohexylmethylenedioxyprogesterone. Melting point: 75°–79° C.; [α]_D+140° (c.=1, in dioxane);

$\lambda_{max}$ (in CH₃OH) = 241 mμ, $E^{1\%}_{1cm.}$ 371

I.R. (in CHCl₃) $\nu_{max}$: 3630, 1710, 1665, 1613, 1354, 1000 cm.⁻¹.

N.M.R. (in CDCl₃) δ: 0.86, 1.19, 2.17, 3.48, 4.70 (doublet), 5.76 p.p.m.

*Elementary analysis.*—Calculated for

C₂₈H₄₀O₄·½CH₃OH (percent): C, 75.00; H, 9.21. Found (percent): C, 74.98 and 74.96; H, 9.13 and 9.16.

(m) In an analogous way 14α,17α-dihydroxyprogesterone was converted with furfural to 14α,17α-furfurylidenedioxyprogesterone. Melting point: 173°–174° C.; [α]_D=+161° (c.=1, in CHCl₃), $\lambda_{max}$ (in methanol) = 217 and 241 mμ, $E^{1\%}_{1cm.}$ 382 resp. 385

I.R. (in CHCl₃) $\nu_{max}$: (no OH); 1712, 1667, 1616, 1350, 1153, 1021 cm.⁻¹.

N.M.R. (in CDCl₃) δ: 0.90, 1.20, 2.18, 5.73, 6.00, 6.5 and 7.47 p.p.m.

*Elementary analysis.*—Calculated for C₂₆H₃₂O₅ (percent): C, 73.56; H, 7.60. Found (percent): C, 73.73 and 73.77; H, 7.72 and 7.65.

(n) Similarly, 14α,17α - dihydroxyprogesterone was converted with p-fluorobenzaldehyde to 14α,17α-(p-fluorobenzylidenedioxy)progesterone. Melting point: 134°–140° C.; [α]_D=+143° (c.=0.5; in CHCl₃), $\lambda_{max}$ (in CH₃OH) = 242 mμ, $E^{1\%}_{1cm.}$ 380

I.R. (in CHCl₃) $\nu_{max}$: (no OH), 1712, 1665, 1610, 1358, 1070 cm.⁻¹.

N.M.R. (in CDCl₃) δ: 0.84, 1.19, 2.19, 5.73, 5.93, 6.9–7.6 (multiplet) p.p.m.

*Elementary analysis.*—Calculated for C₂₈H₃₃O₄F (percent): C, 74.34; H, 7.30. Found (percent): C, 74.32 and 74.28; H, 7.31 and 7.29.

(o) In an analogous way 14α,17α-dihydroxyprogesterone was converted with p-chlorobenzaldehyde to 14α,17α-(p-chlorobenzylidenedioxy)progesterone. Melting point: 194.5°–198° C.; [α]_D=+152° (c.=0.5, in CHCl₃), $\lambda_{max}$ (in CH₃OH) = 220 and 240 mμ, $E^{1\%}_{1cm.}$ 439 resp. 351

I.R. (in CHCl₃) $\nu_{max}$: (no OH); 1711, 1664, 1614, 1601, 1491, 1090 cm.⁻¹.

N.M.R. (in CDCl₃) δ: 0.94, 1.19, 2.21, 5.74, 5.96, 7.47 p.p.m.

*Elementary analysis.*—Calculated for C₂₈H₃₃O₄Cl (percent): C, 71.72; H, 7.04; Cl, 7.58. Found (percent): C, 71.90 and 71.91; H, 7.12 and 7.14; Cl, 7.73 and 7.75.

(p) In an analogous way 14α,17α-dihydroxyprogesterone was converted with p-methylbenzaldehyde to 14α,17α-(p-methylbenzylidenedioxy)progesterone. Melting point: 144.5°–145.5° C.; [α]_D=+158° (c.=0.5 in CHCl₃), $\lambda_{max}$ (in CH₃OH) = 218 and 241 mμ, $E^{1\%}_{1cm.}$ 331 resp. 355

I.R. (in CHCl₃) $\nu_{max}$: (no OH); 1712, 1665, 1616, 1353, 1020 cm.⁻¹.

N.M.R. (in CDCl₃) δ: 0.92, 1.19, 2.20, 2.37, 5.72, 5.93, 7.23 and 7.47 (AB-spectrum) p.p.m.

*Elementary analysis.*—Calculated for C₂₉H₃₆O₄ (percent): C, 77.64; H, 8.09. Found (percent): C, 77.72 and 77.65; H, 8.17 and 8.21.

(q) In an analogous way 14α,17α-dihydroxyprogesterone was converted with p-isopropylbenzaldehyde to 14α,17α-(p-isopropylbenzylidenedioxy)progesterone. Melting point: 140°–142° C.; [α]_D=+133° (c.=0.5, in CHCl₃);

$\lambda_{max}$ (in CH₃OH) = 218 and 242 mμ, $E^{1\%}_{1cm.}$ 329 resp. 34

I.R. (in CHCl₃) $\nu_{max}$: (no OH); 1707, 1663, 1612, 1353, 1090 and 1018 cm.⁻¹.

N.M.R. (in CDCl₃) δ: 0.92, 1.20, 1.26 (doublet), 2.19, 5.69, 5.90, 7.22 and 7.45 (AB-spectrum) p.p.m

*Elementary analysis.*—Calculated for C₃₁H₄₀O₄ (percent): C, 78.15; H, 8.40. Found (percent): C, 78.25 and 78.22; H, 8.34 and 8.35.

(r) In an analogous way 14α,17α-dihydroxyprogesterone was converted with p-methoxybenzaldehyde to 14α,17α-(p-methoxybenzylidenedioxy)progesterone. Melting point: 115° C. and 172° C.; [α]_D=+145° (c.=0.5, in CHCl₃);

$\lambda_{max}$ (in CH₃OH) 227 and 240 mμ, $E^{1\%}_{1cm.}$ 500 resp. 350

I.R. (in CHCl₃) $\nu_{max}$: (no OH); 2840, 1711, 1664, 1588, 1506, 1093 and 1019 cm.⁻¹.

N.M.R. (in CDCl$_3$) δ: 0.91, 1.20, 2.20, 3.80, 5.71, 5.90, 6.9 and 7.5 p.p.m.

*Elementary analysis.*—Calculated for C$_{29}$H$_{36}$O$_5$ (percent): C, 74.97; H, 7.81. Found (percent): C, 74.83 and 74.82; H, 8.02 and 8.00.

(s) In an analogous way 14α,17α-dihydroxyprogesterone was converted with 3,4,5-trimethoxybenzaldehyde to 14α,17α-(3′,4′,5′ - trimethoxybenzylidenedioxy)progesterone. Melting point: 122° C.–125° C.; [α]$_D$=+114° (c.=1 in dioxane);

λ$_{max}$ (in CH$_3$OH)=207 and 236.5 mμ, E$^{1\%}_{1\,cm.}$ 820 respectively 396

I.R. (in CHCl$_3$) ν$_{max}$: (no OH); 2840, 1714, 1669, 1616, 1600, 1500, 1130 cm.$^{-1}$.

N.M.R. (in CDCl$_3$) δ: 0.93, 1.22, 2.23, 3.90, 5.73, 5.90, 6.83 p.p.m.

*Elementary analysis.*—Calculated for C$_{31}$H$_{40}$O$_7$ (percent): C, 70.99; H, 7.63. Found (percent): C, 70.82 and 70.86; H, 7.74 and 7.79.

(t) In an analogous way 14α,17α-dihydroxyprogesterone was converted with p-nitrobenzaldehyde to 14α,17α-(p-nitrobenzylidenedioxy)progesterone. Melting point: 164°–167° C.; [α]$_D$=+143° (c.=1, in dioxane);

λ$_{max}$ (in CH$_3$OH)=205 and 243 mμ, E$^{1\%}_{1\,cm.}$ 285 respectively 463

I.R. (in CHCl$_3$) ν$_{max}$: (no OH); 1713, 1668, 1613, 1520 and 1350 cm.$^{-1}$.

N.M.R. (in CDCl$_3$) δ: 0.96, 1.22, 2.24, 5.75, 6.08, 7.75 and 8.13 (AB-spectrum) p.p.m.

*Elementary analysis.*—Calculated for C$_{28}$H$_{33}$O$_6$N (percent): C, 70.15; H, 6.89. Found (percent): C, 70.28 and 70.26; H, 7.09 and 7.11.

14α,17α - (p-aminobenzylidenedioxy)progesterone was prepared by reduction of 14α,17α-(p-nitrobenzylidenedioxy)progesterone as described by S. Harlet and C. A. Dornfeld (J.A.C.S. 86 (1964) 1781).

To 2 g. of nitro-compound, dissolved in 80 ml. of benzene, 20 g. of activated iron was added. Over a reaction time of 7 hr. 0.4 ml. of water was now and again added (total 8 ml.) to the boiling mixture. The reaction was chromatographically followed (t.l.c. silicagel, benzene/acetone 3:1). Apparently, only 1 component was formed. After 7 hr. the reaction stopped; the nitro-compound was converted for 60%. The amino-compound was isolated by column chromatography (Al$_2$O$_3$); benzene/ethylacetate (20:1) was used as eluent: yield: 1 g. light yellow oil. [α]=+168° (c.=0.5, in CHCl$_3$);

λ$_{max}$ (in CH$_3$OH)=204 and 241 mμ, E$^{1\%}_{1\,cm.}$ 566 respectively 579

I.R. (in CHCl$_3$) ν$_{max}$: 3490, 3400, 1712, 1663, 1622, 1092 cm.$^{-1}$.

N.M.R. (in CDCl$_3$) δ: 0.91, 1.19, 2.19, 5.69, 5.82, 6.67 and 7.30 (AB-spectrum) p.p.m.

*Elementary analysis.*—Calculated for C$_{28}$H$_{35}$O$_4$N (percent): C, 74.83; H, 7.80; N, 3.12. Found (percent): C, 74.62 and 74.58; H, 7.77 and 7.73; N, 3.36 and 3.31.

(u) In an analogous way 14α,17α-dihydroxyprogesterone was converted with 1-naphthaldehyde to 14α,17α-(1′-naphthylmethylenedioxy)progesterone. Melting point: 125° C.–130° C.; [α]$_D$=+62° (c.=1, in dioxane);

λ$_{max}$ (in CH$_3$OH=223, 241 and 280 mμ, E$^{1\%}_{1\,cm.}$ 1850 respectively 336 and 150

I.R. (in CHCl$_3$) ν$_{max}$: (no OH); 3050, 1711, 1665, 1614, 1599, 1352, 1105 cm.$^{-1}$.

N.M.R. (in CDCl$_3$) δ: 0.87, 1.17, 2.23, 5.68, 6.65, 7.4–7.7 and 7.8–8.1 p.p.m.

*Elementary analysis.*—Calculated for C$_{32}$H$_{36}$O$_4$ (percent): C, 79.34; H, 7.44. Found (percent): C, 79.16 and 79.13; H, 7.58 and 7.52.

(v) In an analogous way 14α,17α-dihydroxyprogesterone was converted with 3-chloropropanol to 14α,17α-(3′-chloropropylidenedioxy)progesterone. Melting point: 129° C.–132° C.; [α]$_D$=+143° (c.=0.5, in CHCl$_3$), λ$_{max}$ (CH$_3$OH)=241 mμ, E$^{1\%}_{1\,cm.}$ 382

I.R. (in CHCl$_3$) ν$_{max}$: (no OH); 1710, 1665, 1615 and 1354 cm.$^{-1}$.

N.M.R. (in CDCl$_3$) δ: 0.87, 1.18, 2.16, 3.67 (triplet), 5.18 (triplet), 5.74 p.p.m.

*Elementary analysis.*—Calculated for C$_{24}$H$_{33}$O$_4$Cl (percent): C, 68.49; H, 7.85; Cl, 8.44. Found (percent): C, 68.69 and 68.63; H, 8.01 and 7.98; Cl, 8.54 and 8.50.

(w) In an analogous way 14α,17α-dihydroxyprogesterone was converted with 2-propenal to 14α,17α-(2′-propenylidenedioxy)progesterone. Melting point: 113° C.–115° C.; [α]$_D$=+169° (c.=0.5, in CHCl$_3$):

λ$_{max}$ (in CH$_3$OH); 241.5 mμ, E$^{1\%}_{1\,cm.}$ 427

I.R. (in CHCl$_3$) ν$_{max}$: (no OH); 1710, 1665, 1614, 1354, and 1098 cm.$^{-1}$.

N.M.R. (in CDCl$_3$) δ: 0.83, 1.13, 2.15, 5.70, 5.2–5.8 p.p.m.

*Elementary analysis.*—Calculated for C$_{24}$H$_{32}$O$_4$ (percent): C, 75.00; H, 8.33. Found (percent): C, 74.83 and 74.83; H, 8.32 and 8.32.

In an analogous way 11β,14α,17α-trihydroxyprogesterone was converted with propanol into 11β-hydroxy-14α,17α-propylidenedioxyprogesterone. M.P.=191° C.–193° C.; [α]$_D$=+210° (c.=0.5; CHCl$_3$)

λ$_{max}$ (in CH$_3$OH)=242 mμ; E$^{1\%}_{1\,cm.}$ 392

I.R. (in CHCl$_3$): 3620, 1712, 1667, 1619, 1358, 1130 cm.$^{-1}$.

N.M.R. (in CDCl$_3$): 0.93 (triplet), 1.10, 1.45, 2.16, 4.45, 4.92 (triplet), 5.69 p.p.m.

*Elementary analysis.*—Calc. for C$_{24}$H$_{34}$O$_5$ (percent): C, 71.64; H, 8.46. Found (percent): C, 71.55 and 71.56; H, 8.56 and 8.58.

(y) In an analogous way 11β,14α,17α-trihydroxyprogesterone was converted with pentanal into 11β-hydroxy-14α,17α - pentylidenedioxyprogesterone. M.P.=115.5°–117° C.; [α]$_D$=+187° (c.=0.5; CHCl$_3$)

λ$_{max}$ (in CH$_3$OH)=242 mμ; E$^{1\%}_{1\,cm.}$ 379

I.R. (in CHCl$_3$): 3618, 1712, 1663, 1617, 1358, 1130 cm.$^{-1}$.

N.M.R. (in CDCl$_3$): 0.90 (triplet), 1.10, 2.16, 4.45, 4.95 (triplet), 5.68 p.p.m.

*Elementary analysis.*—Calc. for C$_{26}$H$_{38}$O$_5$ (percent): C, 72.56; H, 8.84. Found (percent): C, 72.46 and 72.42; H, 9.08 and 9.06.

(z$^a$) In an analogous way 11α,14α,17α-trihydroxyprogesterone was converted with propanal into 11α-hydroxy-14α,17α - propylidenedioxyprogesterone. M.P.=170° C.–172° C. [α]$_D$=+143° (c.=0.5; CHCl$_3$).

λ$_{max}$ (in CH$_3$OH)=241 mμ; E$^{1\%}_{1\,cm.}$ 396

I.R. (in CHCl$_3$): 3600, 1710, 1662, 1612, 1353, 1120 cm.$^{-1}$.

N.M.R. (in CDCl$_3$): 0.87, 0.97 (triplet), 1.31, 2.16, 4.05, 4.93 (triplet), 5.73 p.p.m.

(z$^b$) In an analogous way 11α,17α,17α-trihydroxyprogesterone was converted with p-methoxybenzaldehyde into 11α-hydroxy-14α,17α-(p-methoxy benzylidenedioxy) progesterone. M.P.=151° C.–152° C.; [α]$_D$=+55° (c.=0.5; CHCl$_3$)

λ$_{max}$ (in CH$_3$OH)=227 and 246 mμ; E$^{1\%}_{1\,cm.}$ 318 and 145 respectively I.R. (in CHCl$_3$): 3600, 1710, 1662, 1612, 1588, 1508, 1358 cm.$^{-1}$.

N.M.R. (in CDCl$_3$): 0.93, 1.31, 1.88, 2.21, 3.82, 4.1, 5.95, 6.92 and 7.47 (AB-spectrum)

*Elementary analysis.*—Calc. for C$_{29}$H$_{36}$O$_6$ (percent): C, 72.50; H, 7.50. Found (percent): C, 72.31 and 72.25; H, 7.30 and 7.27.

EXAMPLE 4

(a) 20 g. of 14α,17α-dihydroxyprogesterone was suspended in a mixture of 50 ml. of dioxane, 150 ml. of trimethyl-orthoformate and 500 mg. of p-toluenesulfonic acid (monohydrate) and the suspension was stirred at room temperature. As judged by t.l.c. (silica gel in benzene/acetone 3:1) the conversion was complete within 2 hr. The reaction mixture was neutralized with 2.5 ml. of pyridine; 270 ml. of water was slowly added stirring. Stirring was continued for a few hours and an oily residue containing crystals formed. The liquid was decanted and the residue was dissolved in 25 ml. of methanol, to which 1 drop of pyridine had been added; the steroid was again precipitated with 25 ml. of water. The supernatant was decanted and the residue was dried under reduced pressure. The product was twice crystallized from 50 ml. of acetone, to which a trace of pyridine had been added, and 20 ml. of water.

Yield: 8.6 g. of 3-methoxy-14α,17α-methoxymethylenedioxy-3,5-pregnadien-20-one. Melting point: 117° C.–121° C.; $[\alpha]_D = -12.5°$ (c.=1, CHCl$_3$);

$\lambda_{max}$ 239 m$\mu$, $E^{1\%}_{1\,cm.}$ 422

I.R. (in CHCl$_3$)$\nu_{max}$: (no OH); 1712, 1656, 1630, 1353, 1167, 1096 and 1041 cm.$^{-1}$ N.M.R. (in CDCl$_3$)$\delta$: 0.87, 0.97, 2.22, 3.56, 3.60, 5.65, 5.25, 5.16 p.pm Elementary analysis.—Calculated for C$_{24}$H$_{34}$O$_5$ (percent): C, 71.61; H, 8.51. Found (percent): C, 71.81 and 71.84; H, 8.59 and 8.58.

9 g. of 3-methoxy-14α,17α-methoxymethylenedioxy-3,5-pregnadien-20-one were dissolved in 450 ml. of methylene chloride-methanol (1:1) to which a tiny amount of hydrochloric acid has been added. After standing for 1 hr. the reaction mixture was neutralized with 5 ml. of molar sodium hydrogen carbonate solution. The liquid was distilled off under reduced pressure. The residue was crystallized from 200 ml. of methanol/water (1:1). 6.7 g. of 14α,17α - methoxymethylenedioxyprogesterone was obtained. The substance was twice recrystallized from acetone/heptane (2:5) and showed the following physical constants: Melting point: 130° C.–132° C.; $[\alpha]_D = +186°$ (c.=1, in CHCl$_3$);

$\lambda_{max}$ 240.5 m$\mu$, $E^{1\%}_{1\,cm.}$ 431

I.R. (in CHCl$_3$)$\nu_{max}$: (no OH); 1713, 1667, 1616, 1358, 1260 and 1050 cm.$^{-1}$.

N.M.R. (in CDCl$_3$)$\delta$: 0.89, 1.21, 2.22, 3.56 5.63, 5.76 p.p.m.

Elementary analysis—Calculated for C$_{23}$H$_{32}$O$_5$ (percent): C, 7110; H, 8.30. Found (percent): C, 70.86 and 70.92; H, 8.27 and 8.29.

(b) In an analogous way 14α,17α-dihydroxyprogesterone was converted with triethylorthoformate to 3-ethoxy-14α,17α - ethoxymethylenedioxy - 3,5-pregnadien-20-one. Melting point: 83° C.; $[\alpha]_D = -18.5°$ (c.=1.0, in CHCl$_3$), $\lambda_{max}$ (in CH$_3$OH) =240.5 m$\mu$; $E^{1\%}_{1\,cm.}$ 493

I.R. (in CHCl$_3$)$\nu_{max}$: (no OH); 1714, 1655, 1630, 1358 and 1172 cm.$^{-1}$.

N.M.R. (in CDCl$_3$)$\delta$: 0.85, 0.97, 1.28 and 1.29 (two triplets), 2.21, 3.77 and 3.85 (two quadruplets), 5.0–5.3, 5.67 p.p.m.

Elementary analysis.—Calculated for C$_{26}$H$_{38}$O$_5$ (percent): C, 72.53; H, 8.90. Found (percent): C, 72.47 and 72.41; H, 8.78 and 8.78.

(c) In an analogous way 3-ethoxy-14α,17α-ethoxymethylenedioxy-3,5-pregnadien-20-one was converted to 14α,17α-ethoxymethylenedioxyprogesterone.

Amorf; $[\alpha]_D = +168°$ (c.=1.0, in CHCl$_3$), $\lambda_{max}$ (in CH$_3$OH) =240.5 m$\mu$, $E^{1\%}_{1\,cm.}$ 416

I.R. (in CHCl$_3$)$\nu_{amx}$: (no OH); 1713, 1665, 1619 and 1357 cm.$^{-1}$,

N.M.R. (in CDCl$_3$)$\delta$: 0.87, 1.18, 1.28 (triplet), 2.20, 3.83 (quadruplet), 5.60 and 5.73 p.p.m Elementary analysis.—Calculated for C$_{24}$H$_{34}$O$_5$ (percent): C, 71.61; H, 8.51. Found (percent): C, 71.29 and 71.22; H, 8.27 and 8.23.

EXAMPLE 5

(Dehydrogenation)

(a) A mixture of 5 g. of 6α-fluoro-16α-methyl-14α,17α-ethylidendioxyprogesterone, prepared according to the process of Example 2, 3.25 g. of 2,3-dichloro-5,6-dicyanobenzoquinone and 45 ml. of dioxane was heated at boiling temperature for 20 hr. in a flask equipped with a reflux condenser with calcium chloride drying tube. The reacting mixture was cooled down to room temperature and the hydroquinone formed was filtered off and thoroughly washed with methylene chloride. The filtrate was stirred for 30 min. with 8 g. of Al$_2$O$_3$ (neutral) and filtered. This procedure was repeated twice after 1 g. of activated charcoal had been added at the last time. The filtrate which had become light yellow, was distilled under reduced pressure til no more liquid came over. The residue was crystallized from diethyl ether. Yield: 3 g. of 6α-fluoro - 16α - methyl-14α,17α-ethylidenedioxy-1-dehydroprogesterone. Successive crystallization from methanol and methyl isobutyl ketone afforded a product of the following physical content: Melting point: 237° C.–238.5° C.; $[\alpha]_D = +99°$ (c.=0.5, in CHCl$_3$);

$\lambda_{max}$ (CH$_3$OH) =242 m$\mu$, $E^{1\%}_{1\,cm.}$ 405

I.R. (in CHCl$_3$)$\nu_{max}$: 1709, 1665, 1628, 1607, 1352 1111 cm.$^{-1}$.

N.M.R. (in CDCl$_3$)$\delta$: 0.91, 1.05 (doublet), 1.21, 1.36 (doublet), 2.18, 5.24 (quadruplet), 6.40, 6.33 and 7.05 (AB-spectrum) p.p.m.

Elementary analysis.—Calculated for C$_{24}$H$_{31}$O$_4$F (percent): C, 71.65; H, 7.71. Found (percent): C, 71.56 and 71.68; H, 7.82 and 7.77.

(b) In an analogous way 14α,17α-ethylidenedioxyprogesterone, prepared according to Example 1 and 2, was converted to 14α,17α-ethylidenedioxy-1-dehydroprogesterone. Melting point: 212.5° C.–215° C.; $[\alpha]_D = +135°$ (c.=0.5, in CHCl$_3$);

$\lambda_{max}$ (CH$_3$OH) =244 m$\mu$; $E^{1\%}_{1\,cm.}$ 407

I.R. (in CHCl$_3$)$\nu_{max}$: 1710, 1662, 1620, 1602, 1358, 1113 cm.$^{-1}$.

N.M.R. (in CDCl$_3$)$\delta$: 0.88, 1.24, 1.34 (doublet) 2.19, 5.17 (quadruplet), 6.12, 6.35 and 7.1 (AB-spectrum) p.p.m.

Elementary analysis.—Calculated for C$_{23}$H$_{30}$O$_4$ (percent): C, 74.59; H, 8.11. Found (percent): C, 74.69 and 74.75; H, 8.28 and 8.28.

(c) In an analogous way 14α,17α-ethylidenedioxy-6-dehydroprogesterone prepared as in Example 6a was converted to 14α,17α-ethylidenedioxy-1.6-bisdehydro-progesterone. Melting point: 211.5° C.–213° C.; $[\alpha]_D = +89°$ (c.=0.5, in CHCl$_3$);

$\lambda_{max}$ (in CH$_3$OH) =221, 257 and 299 m$\mu$, $E^{1\%}_{1\,cm.}$ 337, 366 respectively 364

I.R. (in CHCl$_3$) $\nu_{max}$: 1711, 1657, 1650, 1630, 1604, 1582, 1113 cm.$^{-1}$.

N.M.R. (in CDCl$_3$) $\delta$: 0.93, 1.20, 1.3 (doublet), 5.2 (multiplet), 6.0–6.6 and 7.0–6.4 p.p.m.

Elementary analysis.—Calculated for C$_{23}$H$_{28}$O$_4$ (percent): C, 75.00; H, 7.61. Found (percent): C, 74.85 and 74.85; H, 7.62 and 7.63.

EXAMPLE 6

(a) A mixture of 48 g. of 14α,17α-ethylidenedioxyprogesterone, prepared according to Example 1 or 2, 145 g. of chloranil and 3.4 l. of t-butanol was heated to boiling temperature with stirring. After boiling for two hours the conversion was complete. The reaction mixture was cooled to room temperature and worked up as described sub Example 5. Yield: 20 g. of 14α,17α-ethylidenedioxy-6-dehydro-progesterone. Melting point: 186.5°–187° C.; $[\alpha]_D = +123°$ (c.=0.5, in CHCl$_3$);

$\lambda_{max}$ (in CH$_3$OH) =283 m$\mu$, $E^{1\%}_{1\,cm.}$ 739

I.R. (in CHCl$_3$) $\nu_{max}$: 1710, 1650, 1619, 1580, 1352, 1111 cm.$^{-1}$

N.M.R. (in CDCl$_3$) δ: 0.90, 1.12. 1.37 (doublet), 5.26 (quadruplet), 5.71, 6.18 p.p.m.

*Elementary analysis.*—Calculated for C$_{23}$H$_{30}$O$_4$ (percent): C, 74.59; H, 8.11. Found (percent): C, 74.48 and 74.55; H, 8.13 and 8.16.

(b) In an analogous way 6α-methyl-14α,17α-ethylidenedioxyprogesterone, prepared according to Example 2b, was converted to 6-methyl-14α,17α-ethylidenedioxy-6-dehydroprogesterone. Melting point: 207° C.–212° C.; $[\alpha]_D = +115°$ (c.=0.5, in CHCl$_3$);

$\lambda_{max}$ (in CH$_3$OH) =289 m$\mu$, $E^{1\%}_{1\,cm.}$ 591

I.R. (in CHCl$_3$) $\nu_{max}$: 1712, 1653, 1630, 1580, 1359, 1115 cm.$^{-1}$.

N.M.R. (in CDCl$_3$) δ: 0.89, 1.08, 1.36 (doublet), 1.86 (doublet), 2.17, 5.19 (quadruplet), 5.83 and 6.00 p.p.m.

*Elementary analysis.*—Calculated for C$_{24}$H$_{32}$O$_4$ (percent): C, 75.00; H, 8.33. Found (percent): C, 74.84 and 74.82; H, 8.42 and 8.37.

(c) In an analogous way 16α-methyl-14α,17α-ethylidenedioxyprogesterone was converted to 16α-methyl-14α,17α-ethylidenedioxy-6-dehydroprogesterone. Melting point: 171° C.–172° C.; $[\alpha]_D = +90°$ (c.=0.5, in CHCl$_3$);

$\lambda_{max}$ (in CH$_3$OH) =283 m$\mu$, $E^{1\%}_{1\,cm.}$ 675

I.R. (in CHCl$_3$) $\nu_{max}$: 1706, 1652, 1648, 1617, 1581, 1351, 1109 cm.$^{-1}$.

N.M.R. (in CDCl$_3$) δ: 0.93, 1.06 (doublet), 1.12, 1.38 (doublet), 2.15, 5.24 (quadruplet), 5.66–6.10 p.p.m.

*Elementary analysis.*—Calculated for C$_{24}$H$_{32}$O$_4$ (percent): C, 75.00; H, 8.33. Found (percent): C, 74.89 and 74.95; H, 8.33 and 8.38.

(d) In an analogous way 14α,17α-ethylidenedioxy-1-dehydroprogesterone, prepared according to Example 5b, was converted to 14α,17α-ethylidenedioxy-1,6-bisdehydroprogesterone. Melting point 212° C.–213.5° C.; $[\alpha]_D = +90°$ (c.=1, in CHCl$_3$).

EXAMPLE 7

10 l. of nutrient medium consisting of 1% yeast extract and 0.5% pepton of pH 6.8 were inoculated with 500 ml. of shake culture of *Corynebacterium simplex*. The micro-organism was grown at 28° C. with vigorous stirring and strong aeration. After 12 hrs. 2 g. of 14α,17α-ethylidenedioxyprogesterone, dissolved in 40 ml. of acetone, was added. The conversion was followed by paper-chromatography. The conversion was complete within 24 hrs. The fermentation fluid was three times extracted with 2.1 of methylene chloride; the organic extract was washed with water and evaporated to dryness under reduced pressure. The crude 14α,17α-ethylidenedioxy-1-dehydroprogesterone was crystallized from methanol. Melting point: 214° C.–216° C.; $[\alpha]_D = +136°$ (c.=1, in CHCl$_3$), $\lambda_{max}$ (in CH$_3$OH) =244 m$\mu$, $E^{1\%}_{1\,cm.}$ 410

EXAMPLE 8

(a) 10 l. of nutrient medium consisting of 0.5% of glucose and 0.5% of corn steep liquor was inoculated with 500 ml. of shake culture of *Curvularia lunata*.

The micro-organism was grown at 26° C. with vigorous stirring and aeration. After 24 hrs. a solution of 3 g. of 14α,17α-ethylidenedioxyprogesterone, prepared according to Example 1 or 2, in 60 ml. of acetone was added. The conversion was complete after 72 hrs. The mycelium was filtered off and washed with water. The filtrate and the washing were combined and three times extracted with 2 l. of methyl isobutyl ketone. The extract was evaporated to dryness under reduced pressure and crystallized from methanol-water; yield 0.9 g. of 11β-hydroxy-14α,17α-ethylidenedioxyprogesterone. Recrystallization from methyl isobutyl ketone afforded a product melting at 260.5° C.–262° C.; $[\alpha]_D = +218°$ (c.=0.5, in CHCl$_3$);

$\lambda_{max}$ (in CH$_3$OH) =141 m$\mu$, $E^{1\%}_{1\,cm.}$ 363

I.R. (in CHCl$_3$) $\nu_{max}$: 3612, 1712, 1665, 1620, 1359 and 1120 cm.$^{-1}$.

N.M.R. (in CDCl$_3$) δ: 1.09, 1.33 (doublet), 1.45, 2.16, 4.5, 5.16 (quadruplet), 5.68 p.p.m.

*Elementary analysis.*—Calculated for C$_{23}$H$_{32}$O$_5$ (percent): C, 71.13; H, 8.22. Found (percent): C, 71.37 and 71.41; H, 8.19 and 8.20.

(b) In an analogous way 14α,17α-ethylidenedioxyprogesterone was converted with *Aspergillus ochraceus* to 11α-hydroxy-14α,17α-ethylidenedioxyprogesterone. M.P.: 234° C.–236° C.; $[\alpha]_D = +158°$ (c.=0.5; in CHCl$_3$)

$\lambda_{max}$ (in CH$_3$OH) =242 m$\mu$, $E^{1\%}_{1\,cm.}$ 420

I.R. (in CHCl$_3$) $\nu_{max}$: 3600, 1712, 1665, 1614, 1356, 1117 cm.$^{-1}$.

N.M.R. (in CDCl$_3$) δ: 0.87, 1.30, 1.40 (doublet), 2.17, 4.1, 5.20 (vaque quadruplet), 5.78 p.p.m.

*Elementary analysis.*—Calculated for C$_{23}$H$_{32}$O$_5$ (percent): C, 71.13; H, 8.22. Found (percent): C, 71.15 and 71.08; H, 8.24 and 8.30.

(c) 20 g. of 11β-hydroxy-14α,17α-ethylidenedioxyprogesterone were suspended in 200 ml. of methylene dichloride and 10 ml. of acetic anhydride. 2 ml. of 70% perchloric acid were added and the mixture was stirred at room temperature for one hour. The reaction mixture was diluted with 200 ml. of methylene dichloride, washed with 0.1 N sodium hydroxide and with water. The organic solution was concentrated in vacuum until dryness and the residue was crystallized from methanol. The yield was 100 g. of 11β-acetoxy-14α,17α-ethylidenedioxyprogesterone. M.P.: 217° C.–218° C.; $[\alpha]_D = +211°$ (c.=0.5; CHCl$_3$)

$\lambda_{max}$ (in CH$_3$OH) =239 m$\mu$; $E^{1\%}_{1\,cm.}$ =399

I.R. (in CHCl$_3$) $\nu$: 1730, 1713, 1668, 1620, 1360, 1120, 1028 cm.$^{-1}$.

N.M.R. (in CDCl$_3$) δ: 0.97, 1.29, 1.36 (doublet), 2.04, 2.13, 5.18 (multiplet), 5.48, 5.70 p.p.m.

*Elementary analysis.*—Calc. for C$_{25}$H$_{34}$O$_6$ (percent): C, 69.77; H, 7.91. Found (percent): C, 69.75 and 69.82; H, 7.89 and 7.93.

EXAMPLE 9

(a) To a suspension of 13 g. of 6α-fluoro-16α-methyl-14α,17α-ethylidenedioxyprogesterone, prepared according to Example 2(g), in 200 ml. of dioxane, 0.75 g. of p-toluenesulfonic acid (monohydrate) and 15 g. of triethylorthoformate were added. The mixture was stirred for 3.5 hr. at room temperature: successively 6 ml. of pyridine and 100 ml. of water were added dropwise. The crystalline product was filtered off, washed with water and dried. Recrystallization from a mixture of methylene chloride and methanol (with a trace of pyridine) gave 7 g. of 3-ethoxy-6-fluoro-16α-methyl-14α,17α-ethylidenedioxy-3,5-pregnadien-20-one. Melting point: 149.5° C.–150° C.; $[\alpha]_D = -19°$ (c.=0.5, in CHCl$_3$), $\lambda_{max}$ (in CH$_3$OH) =239 m$\mu$, $E^{1\%}_{1\,cm.}$ 503

I.R. (in CHCl$_3$) $\nu_{max}$: 1738, 1634, 1353 and 1112 cm.$^{-1}$.

N.M.R. (in CDCl$_3$) δ: 0.87, 0.95, 1.03 (doublet), 1.29 (triplet), 1.40 (doublet), 2.14, 3.80 (quadruplet), 5.21 (quadruplet), 5.48 p.p.m.

*Elementary analysis.*—Calculated for C$_{26}$H$_{37}$O$_4$F (percent): C, 72.24; H, 8.56. Found (percent): C, 72.23 and 72.27; H, 8.56 and 8.54.

(b) In an analogous way 14α,17α-ethylidenedioxyprogesterone, prepared according to Example 1 or 2, was converted to 3-ethoxy-14α,17α-ethylidenedioxy-3,5-pregnadien-20-one. Melting point: 146.5°–150° C.; $[\alpha]_D = -8.3°$ (c.=0.5, in CHCl$_3$);

$$\lambda_{max} \text{ (in CH}_3\text{OH)} = 239.5 \text{ m}\mu, \text{ E}_{1\,cm.}^{1\%} 500$$

I.R. (in CHCl$_3$)$\nu_{max}$: 1711, 1651, 1628, 1169 and 1116 cm.$^{-1}$.

N.M.R. (in CDCl$_3$)$\delta$: 0.83, 0.96, 1.29 (triplet), 1.37 (doublet), 2.16, 3.78 (quadruplet), 5.08–5.30 p.p.m.

*Elementary analysis.*—Calculated for C$_{25}$H$_{36}$O$_4$ (percent): C, 75.00; H, 9.00. Found (percent): C, 75.03 and 74.93; H, 9.00 and 8.96.

(c) In an analogous way 6-chloro-14α,17α-ethylidenedioxyprogesterone, prepared according to Example 2(c), was converted to 3-ethoxy-6-chloro-14α,17α-ethylidenedioxy-3,5-pregnadien-20-one. Melting point: 168.5° C.–169° C.; $[\alpha]_D = -9.4°$ (c.=0.5, in CHCl$_3$);

$$\lambda_{max} \text{ (in CH}_3\text{OH)} = 250 \text{ m}\mu, \text{ E}_{1\,cm.}^{1\%} 525$$

I.R. (in CHCl$_3$)+trace pyridine)$\nu_{max}$: 1711, 1645, 1620 and 1352 cm.$^{-1}$.

N.M.R. (in CDCl$_3$)$\delta$: 0.82, 0.98, 1.35 (triplet), 1.37 (doublet), 2.16.

*Elementary analysis.*—Calculated for C$_{25}$H$_{35}$O$_4$Cl (percent): C, 64.06; H, 8.0; Cl, 8.16. Found (percent): C, 68.95 and 68.85; H, 7.95 and 7.96; Cl, 8.10 and 8.02.

(d) In an analogous way 15β-chloro-14α,17α-ethylidenedioxyprogesterone, prepared according to Example 2(e), was converted to 3-ethoxy-15β-chloro-14α,17α-ethylidenedioxy-3,5-pregnadien-20-one. Melting point: 167° C.–170° C.; $[\alpha]_D = -107°$ (c.=0.5, in CHCl$_3$);

$$\lambda_{max} \text{ (in CH}_3\text{OH)} = 239.5 \text{ m}\mu, \text{ E}_{1\,cm.}^{1\%} 458$$

I.R. (CHCl$_3$)$\nu_{max}$: 1711, 1653, 1628, 1353, 1170 and 1113 cm.$^{-1}$.

N.M.R. (in CDCl$_3$)$\delta$: 1.00, 1.08, 1.30 (triplet), 1.39 (doublet), 2.17, 3.78 (quadruplet), 4.33 (multiplet), 5.01 (quadruplet), 5.13 p.p.m.

*Elementary analysis.*—Calculated for C$_{25}$H$_{35}$O$_4$Cl (percent): C, 69.04; H, 8.06; Cl, 8.17. Found (percent): C, 69.00 and 69.06; H, 8.12 and 8.16; Cl, 8.22 and 8.28.

(e) In an analogous way 14α,17α-propylidenedioxyprogesterone, prepared according to Example 3(b), was converted to 3-ethoxy-14α,17α-propylidenedioxy-3,5-pregnadien-20-one. Melting point: 128° C.–131° C.; $[\alpha]_D = -64°$ (c.=0.5, in CHCl$_3$);

$$\lambda_{max} \text{ (in CH}_3\text{OH)} = 239.5 \text{ m}\mu, \text{ E}_{1\,cm.}^{1\%} 499$$

I.R. (in CHCl$_3$)$\nu_{max}$: 1710, 1652, 1625, 1355 and 1170 cm.$^{-1}$.

N.M.R. (in CDCl$_3$)$\delta$: 0.85, 0.95, 0.96 (triplet), 1.29 (triplet), 2.17, 3.78 (quadruplet), 4.92 (triplet), 5.06–5.28 p.p.m.

*Elementary analysis.*—Calculated for C$_{26}$H$_{38}$O$_4$ (percent): C, 75.36; H, 9.18. Found (percent): C, 75.35 and 75.29; H, 9.11 and 9.09.

EXAMPLE 10

To a cooled mixture of 60 ml. of dimethylformamide and 385 ml. of dichloroethane a solution of 73 g. of phosgene in 560 ml. of dichloroethane was slowly added with stirring; the temperature of the mixture was not allowed to rise above 5° C. To this mixture a solution of 63 g. of 3 - ethoxy-14α,17α-ethylidenedioxy-3,5-pregnadien-20-one prepared according to Example 9(b) in 300 ml. of dichloroethane were added at once. The reaction mixture was stirred for 4 hr. at room temperature. A solution of 225 g. of sodium acetate in 150 ml. of water and 600 ml. of methanol was then added. Stirring was continued for 10 minutes and the mixture was poured into 1.5 l. of water. The dichloroethane layer was decanted and the water layer was extracted with methylene chloride. The combined organic layers were concentrated under reduced pressure to about 250 ml. The crystalline product was filtered off, washed with cold dichloroethane and dried. 32.6 g. of 3-ethoxy-6-formyl-14α,17α-ethylidenedioxy-3,5-pregnadien-20-one were obtained. 2.0 g. of this formyl derivative was refluxed for 23 hr. with 50 ml. ethanol, 2.5 ml. of glacial acetic acid, 10 ml. of cyclohexane and 2.0 g. of Pd/C. The reaction mixture was filtered and the filtrate was evaporated under reduced pressure. The residue was crystallized from diethyl ether. 1.2 g. of 6α-methyl-14α,17α-ethylidenedioxyprogesterone was obtained. Recrystallization from methanol and methyl isobutyl ketone gave a product melting at 154° C.–155.5° C. $[\alpha]_D = +166°$ (c.=0.5, in CHCl$_3$)

$$\lambda_{max} \text{ (in CH}_3\text{OH)} = 240 \text{ m}\mu, \text{ E}_{1\,cm.}^{1\%} 387$$

I.R. (in CHCl$_3$)$\nu_{max}$: 1710, 1662, 1609, 1358, 1118 cm.$^{-1}$.

N.M.R. (in CDCl$_3$)$\delta$: 0.83, 1.16, 1.07 (doublet), 1.35 (doublet), 2.15, 5.16 (quadruplet), 5.79 p.p.m.

*Elementary analysis.*—Calculated for C$_{24}$H$_{34}$O$_4$ (percent): C, 74.61; H, 8.81. Found (percent): C, 74.69 and 74.66; H, 8.75 and 8.74.

EXAMPLE 11

A solution of 2 g. of 3-ethoxy-14α,17α-ethylidenedioxy-3,5-pregnadien-20-one, prepared according to Example 9b, 1.4 g. of N-chlorosuccinimide in 20 ml. of dioxane, to which 1.0 ml. of a 0.68 N perchloric acid solution had been added, was stirred in the dark for 15 minutes. The reaction mixture was then poured into 60 ml. of water, in which 2 g. of sodium metabisulfite had been dissolved. The resulting oil was taken up in methylene chloride, washed with a potassium carbonate (10%) solution and evaporated to dryness. A yellow oil formed, which was dissolved in methanol and slowly poured into 60 ml. of water with vigorous stirring. The crystals obtained were filtered off, washed with water and dried. 1.4 g. of 6β-chloro-14α,17α - ethylidenedioxyprogesterone had been formed. Melting point: 84° C.–92° C.; $[\alpha]_D = +96°$ (c.=0.5, in CHCl$_3$)

$$\lambda_{max} \text{ (in CH}_3\text{OH)} = 240 \text{ m}\mu, \text{ E}_{1\,cm.}^{1\%} 306$$

I.R. (in CHCl$_3$) $\xi_{max}$: 1710, 1678, 1614, 1358 and 1117 cm.$^{-1}$.

N.M.R. (in CDCl$_3$) $\delta$:0.9, 1.37 (doublet), 1.47, 2.19, 4.83 (multiplet), 5.91 p.p.m.

The isomerization of the 6β-chloro derivative to the 6α-compound was accomplished via the 3-ethyl enol ether. Hydrolysis of the 3-ethoxy-6-chloro-14α,17α-ethylidenedioxy-3,5-pregnadien-20-one in a mixture of acetone and hydrochloric acid yielded the 6α-chloro-14α,17α-ethylidenedioxyprogesterone. Melting point: 86° C.–92° C. and 143°–145° C.; $[\alpha]_D = +145°$ (c.=0.5, in CHCl$_3$).

EXAMPLE 12

To a solution of 1.0 g. of 14α,17α-ethylidenedioxyprogesterone, prepared according to Example 1 or 2, in 10 ml. of pyridine 0.5 ml. of sulfuryl chloride was added with stirring. The dark colored reaction mixture was then stirred for 2.5 hr. at room temperature and poured into 50 ml. of a 3 N sulfuric acid. The crystalline product was filtered off, thoroughly washed with water and dried. Yield: 0.85 g. of 4-chloro-14α,17α-ethylidenedioxyprogesterone. Recrystallization from methanol-water and after that from methyl isobutyl ketone gave a product with a melting point of 176.5° C.–179° C.; $[\alpha]_D = +184°$ (c.=0.5, in CHCl$_3$)

$$\lambda_{max} \text{ (in CH}_3\text{OH)} = 255 \text{ m}\mu, \text{ E}_{1\,cm.}^{1\%} 295$$

I.R. (in CHCl$_3$) $\xi_{max}$: 1710, 1687, 1583, 1355, 1115 cm.$^{-1}$.

N.M.R. (in CDCl$_3$) $\delta$:0.85, 1.23, 1.37 (doublet), 2.16, 5.15 (quadruplet) p.p.m.

*Elementary analysis.*—Calc'd for C$_{23}$H$_{31}$O$_4$Cl (406.5) (percent): C, 67.89; H, 7.62; Cl, 8.73. Found (percent): C, 68.04 and 67.93; H, 7.66 and 7.77; Cl, 8.52 and 8.63.

EXAMPLE 13

1 g. of 14α,17α-(3'-methoxycarbonylpropylidenedioxy)-progesterone, prepared according to Example 3, was dissolved in 8 ml. of ethanol. To this solution 2 ml. of a 10 percent solution of sodium hydroxide in water were added and the mixture refluxed for 30 minutes. 30 ml. of water were added and the mixture was acidified with hydrochloric acid to pH=2. The precipitate was collected, washed with water and dried. The yield was 400 mg. of 14α,17α - (3' - carboxy)propylidenedioxyprogesterone. After several crystallizations from methanol-water the product has M.P. 174–176° C., [α]+157° (c.=0.5, CHCl$_3$)

$\lambda_{max}$ (in CH$_3$OH) = 241 mμ, $E_{1\ cm.}^{1\%}$ 390

I.R. (in CHCl$_3$) 3520, 1745, 1712, 1668, 1665 and 1359 cm.$^{-1}$.

N.M.R. (in CDCl$_3$):0.85, 1.18, 2.14, 5.1 and 5.72 p.p.m.

*Elementary analysis.*—Calc'd for C$_{25}$H$_{34}$O$_6$ (percent): C, 69.77; H, 7.91. Found (percent): C, 69.69 and 69.23; H, 8.04 and 7.97.

EXAMPLE 14

A mixture of 20 g. of 11β-hydroxy-14α,17α-ethylidenedioxyprogesterone, prepared according to Example 8b, 7 g. of CrO$_3$, 210 ml. of acetic acid and 70 ml. of water was stirred at room temperature. After 15 min. excess reagent was decomposed with a solution of 20 g. of NaHSO$_3$ in 200 ml. of water. The reaction mixture was diluted with 300 ml. of water and three times extracted with 100 ml. of methyl isobutyl ketone. The organic layer was washed with 10 percent aqueous potassium carbonate, then with water. The organic solution was concentrated to dryness under vacuum. The residue was crystallized twice from methanol. The yield was 11.7 g. of 11-oxo-14α, 17α-ethylidenedioxyprogesterone with M.P. 184–187° C., [α]$_D$+228° (c.=0.5; CHCl$_3$)

$\lambda_{max}$ (in CH$_3$OH) = 238 mμ, $E_{1\ cm.}^{1\%}$ 398

I.R. (in CHCl$_3$):1710, 1664, 1614, 1354 and 1113 cm.$^{-1}$.

N.M.R. (in CDCl$_3$):0.81, 1.40, 1.45 (doublet), 2.13, 5.31 (quadruplet) and 5.73 p.p.m.

*Elementary analysis.*—Calc'd for C$_{23}$H$_{30}$O$_5$ (percent): C, 71.50; H, 7.77. Found (percent): C, 71.35 and 71.36; H, 7.87 and 7.89.

EXAMPLE 15

To a stirred suspension of 2.25 g. of 15β-bromo-14α, 17α-ethylidenedioxyprogesterone in 100 ml. of anhydrous xylene 2.24 g. of potassium tert-butylate were added. The mixture was kept under nitrogen and refluxed for 10 minutes. After cooling the reaction mixture was washed with water and then evaporated to dryness in vacuum. The residue was dissolved in 100 ml. of acetone and to this solution 10 ml. of 1 N HCl were added. After 1 hour the solution was concentrated, diluted with water and extracted with methyl isobutyl ketone. The extract was washed with 10% aqueous sodium bicarbonate and then with water. The organic solution was evaporated to dryness under reduced pressure and the residue crystallized from methanol. There was obtained 540 mg. of 14α,17α-ethylidenedioxy 15-dehydroprogesterone with M.P.=218° C.-222° C.; [α]$_D$=+67° (c.=0.5; CHCl$_3$)

$\lambda_{max}$ (in CH$_3$OH) = 242 mμ, $E_{1\ cm.}^{1\%}$ 435

I.R. (in CHCl$_3$):1713, 1668, 1616, 1359, 1120, 1109 cm.$^{-1}$.

N.M.R. (in CDCl$_3$):0.87, 18, 1.38 (doublet), 2.17, 4.88 (multiplet), 5.73, 6.15 and 6.19 (AB-spectrum) p.p.m.

*Elementary analysis.*—Calc'd for C$_{23}$H$_{30}$O$_4$ (percent): C, 74.59; H, 8.11. Found (percent): C, 74.32 and 74.28; H, 8.29 and 8.27.

The invention includes within its scope pharmaceutical preparations containing, as the active ingredient, at least one of the therapeutically active compounds of the general Formulae I and II in association with a pharmaceutically acceptable carrier. The preparations may take any of the forms customarily employed for administration of therapeutically active substances, but the preferred types are those suitable for oral administration, especially tablets, including sustained release tablets, pills and capsules including the substance and those suitable for parenteral administration. The tablets and pills may be formulated in the usual manner with one or more pharmaceutically acceptable diluents or excipients, and include materials of lubricating nature. Capsules made of absorbable material, such as gelatin, may contain the active substance alone or in admixture, with a solid or liquid diluent. Liquid preparations may be in the form of suspensions, emulsions, syrups or elixirs of the active substance in water or other liquid medium commonly used for making orally acceptable pharmaceutical formulations.

The active substance may also be made up in a form suitable for parenteral administration, i.e. as a suspension or emulsion in sterile water or an organic liquid usually employed for injectable preparations, for example a vegetable oil such as corn or olive oil, or a sterile solution in water or an organic solvent.

When used for contraceptive purposes the compounds may be administered orally in daily dosages such as tablets of 1.5 to 7.5 mg. the compounds may also be administered parenterally, subcutaneously or intramuscularly in the form of a depot preparation containing from 150 to 250 mg. of active substance as a crystal suspension in water or dissolved in a very pure oil such as corn oil. The depot form will give protection against conception for 2 to 3 months. In combating threatened abortus or dysmenorrhoea the daily dosages range from 1–5 mg. given orally or parenterally.

What we claim and desire to secure by Letters Patent is:

1. A 14α,17α-methylenedioxypregnane derivative having a formula selected from the group consisting of

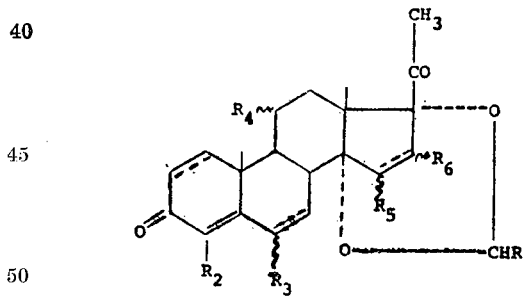

and

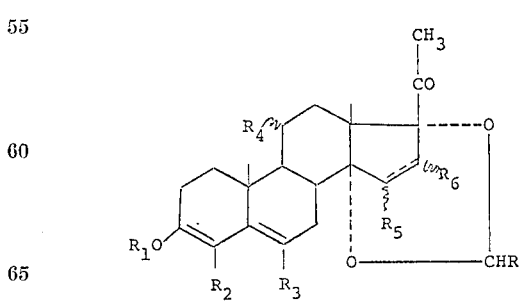

wherein R is a straight or branched chain aliphatic hydrocarbon group of less than 10 carbon atoms; said aliphatic hydrocarbon substituted by a substituent selected from halogen atoms, carboxyl, and methoxy-carbonyl groups; aryl which may be substituted by a member selected from the group consisting of halogen atoms, one or more lower alkoxy groups, lower alkyl nitro and amino groups; aryl-lower-alkyl; a cycloalkyl group containing from 3 to 8 carbon atoms; a lower alkoxy group or a furyl group;

$R_1$ is lower alkyl;
$R_2$ is hydrogen, halogen or hydroxyl;
$R_3$ is hydrogen, halogen or lower alkyl;
$R_4$ is hydrogen, α-hydroxyl, free or acylated β-hydroxyl or a keto group,
$R_5$ is hydrogen, halogen or β-hydroxyl, and
$R_6$ is hydrogen or methyl.

2. A 14α,17α-methylenedioxypregnane derivative according to claim 1, wherein R is a straight or branched chain alkyl group of less than 6 carbon atoms.

3. A 14α,17α-methylenedioxypregnane derivative according to claim 1 wherein R is an alkyl group selected form the group consisting of methyl, ethyl, butyl, t-butyl and pentyl-3.

4. A 14α,17α-methylenedioxypregnane derivative according to claim 1 in which said derivative is 14α,17α-ethylidenedioxyprogesterone.

5. A 14α,17α - methylenedioxypregnane derivative according to claim 1 in which said derivative is 3-ethoxy-14α,17α-ethylidenedioxy-3,5-pregnadien-20-one.

6. A 14α,17α-methylenedioxypregnane derivative according to claim 1 in which said derivative is 14α,17-α-ethylidenedioxy-1-dehydroprogesterone.

7. A 14α,17α-methylenedioxypregnane derivative according to claim 1 in which said derivative is 14α,17-α-ethylidenedioxy-6-dehydroprogesterone.

8. A 14α,17α-methylenedioxypregnane derivative according to claim 1 in which said derivative is 14α,17α-ethylidenedioxy-1,6-bisdehydroprogestrone.

9. A 14α,17α-methylenedioxypregnane derivative according to claim 1 in which said derivative is 4-chloro-14α,17α-ethylidenedioxyprogesterone.

10. A 14α,17α-methylenedioxypregnane derivative according to claim 1 in which said derivative is 6α-chloro-14α,17α-ethylidenedioxy-progesterone.

11. A 14α,17α-methylenedioxypregnane derivative according to claim 1 in which said derivative is 6β-chloro-14α,17α-ethylidenedioxyprogesterone.

12. A 14α,17α-methylenedioxypregnane derivative according to claim 1 in which said derivative is 3-ethoxy-6-chloro-14α,17α-ethylidenedioxy-3,5-pregnadien-20-one.

13. A 14α,17α-methylenedioxypregnane derivative according to claim 1 in which said derivative is 6α-methyl-14α,17α-ethylidenedioxy-progesterone.

14. A 14α,17α-methylenedioxypregnane derivative according to claim 1 in which said derivative is 6-methyl-14α,17α-ethylidenedioxy-6-dehydroprogesterone.

15. A 14α,17α-methylenedioxypregnane derivative according to claim 1 in which said derivative is 15β-bromo-14α,17α-ethylidenedioxyprogesterone.

16. A 14α,17α-methylenedioxypregnane derivative according to claim 1 in which said derivative is 15β-cholor-14α,17α-ethylidenedioxyprogesterone.

17. A 14α,17α-methylenedioxypregnane derivative according to claim 1 in which said derivative is 3-ethoxy-15β - chloro - 14α,17α-ethylidenedioxy-3,5-pregnadien-20-one.

18. A 14α,17α-methylenedioxypregnane derivative according to claim 1 in which said derivative is 15β-fluoro-14α,17α-ethylidenedioxyprogesterone.

19. A 14α,17α-methylenedioxypregnane derivative according to claim 1 in which said derivative is 16α-methyl-14α,17α-ethylidenedioxy-6-dehydroprogesterone.

20. A 14α,17α-methylenedioxypregnane derixative according to claim 1 in which said derivative is 14α-17α-ethylidenedioxy-15-dehydroprogesterone.

21. A 14α,17α-methylenedioxypregane derivative according to claim 1 in which said derivative is 6α-fluoro-16α-methyl-14α,17α-ethylidenedioxyprogresterone.

22. A 14α,17α-methylenedioxypregnane derivative according to claim 1 in which said derivative is 3-ethoxy-6-fluoro-16α-methyl-14α,17α - ethylidenedioxy - 3,5 - pregnadien-20-one.

23. A 14α,17α-methylenedioxypregnane derivative according to claim 1 in which said derivative is 6α-fluoro-16α - methyl-14α,17α-ethylidenedioxy-1-dehydroprogesterone.

24. A 14α,17α-methylenedioxypregnane derivative according to claim 1 in which said derivative is 6α-fluoro-15β - chloro - 16α - methyl - 14α,17α - ethylidenedioxyprogesterone.

25. A 14α,17α-methylenedioxypregnane derivative according to claim 1 in which said derivative is 6α-fluoro-5β - bromo - 16α - methyl - 14α,17α - ethylidenedioxyprogesterone.

26. A 14α,17α-methylenedioxypregnane derivative according to claim 1 in which said derivative is 15β-hydroxy-14α,17α-ethylidenedioxyprogesterone.

27. A 14α,17α-methylenedioxypregnane derivative according to claim 1 in which said derivative is 11α-hydroxy-14α,17α-ethylidenedioxyprogesterone.

28. A 14α,17α-methylenedioxypregnane derivative according to claim 1 in which said derivative is 11β-hydroxy-14α,17α-ethylidenedioxyprogesterone.

29. A 14α,17α-methylenedioxypregnane derivative according to claim 1 in which derivative is 11β-acetyloxy-14α,17α-ethylidenedioxyprogesterone.

30. A 4α,17α-methylenedioxypregnane derivative according to claim 1 in which said derivative is 11-oxo-14α,17α-ethylidenedioxyprogesterone.

31. A 14α,17α-methylenedioxypregnane derivative according to claim 1 in which said derivative is 14α,17α-propylidenedioxyprogestrone.

32. A 14α,17α-methylenedioxypregnane derivative according to claim 1 in which said derivative is 15β-chloro-14α,17α-propylidenedioxyprogesterone.

33. A 14α,17α-methylenedioxypregnane derivative according to claim 1 in which said derivative is 11α-hydroxy-14α,17α-propylidenedioxyprogestrone.

34. A 14α,17α-methylenedioxypregnane derivative according to claim 1 in which said derivative is 11β-hydroxy-14α,17α-propylidenedioxyprogesterone.

35. A 14α,17α-methylenedioxypregnane derivative according to claim 1 in which said derivative is 3-ethoxy 14α,17α-propylidenedioxy-3,5-pregnadien-20-one.

36. A 14α,17α-methylenedioxypregnane derivative according to claim 1 in which said derivative is 14α,17α-(3'-chloropropylidenedioxy)progesterone.

37. A 14α,17α-methylenedioxypregnane derivative according to claim 1 in which said derivative is 14α,17α-(3'-carboxypropylidenedioxy)progesterone.

38. A 14α,17α-methylenedioxypregnane derivative according to claim 1 in which said derivative is 14α,17α-(2',2'-dimethylpropylidenedioxy)progesterone.

39. A 14α,17α-methylenedioxypregnane derivative according to claim 1 in which said derivative is 14α,17α-(3'-methoxycarbonylpropylidenedioxy)progesterone.

40. A 14α,17α-methylenedioxypregnane derivative according to claim 1 in which said derivative is 14α,17α-(2'-ethylbutylidenedioxy)progesterone.

41. A 14α,17α-methylenedioxypregnane derivative according to claim 1 in which said derivative is 14α,17α-pentylidenedioxyprogesterone.

42. A 14α,17α-methylenedioxypregnane derivative according to claim 1 in which said derivative is 11β-hydroxy-14α,17α-pentylidenedioxyprogesterone.

43. A 14α,17α-methylenedioxypregnane derivative according to claim 1 in which said derivative is 14α,17α-octylidenedioxyprogesterone.

44. A 14α,17α-methylenedioxypregnane derivative according to claim 1, wherein R is phenyl or a substituted phenyl group.

45. A 14α,17α-methylenedioxypregnane derivative according to claim 1 wherein R is a phenyl group selected from the group consisting of p-fluorophenyl, p-chlorophenyl, p-methylphenyl, p-isopropylphenyl, p-methoxyphenyl, p-nitrophenyl, p-aminophenyl, and 3,4,5-trimethoxyphenyl.

46. A 14α,17α-methylenedioxypregnane derivative according to claim 1 in which said derivative is 14α,17α-benzylidenedioxyprogesterone.

47. A 14α,17α-methylenedioxypregnane derivative according to claim 1 in which said derivative is 14α,17α-(p-fluorobenzylidenedioxy)progesterone.

48. A 14α,17α-methylenedioxypregnane derivative according to claim 1 in which said derivative is 14α,17α-(p-chlorobenzylidenedioxy)progesterone.

49. A 14α,17α-methylenedioxypregnane derivative according to claim 1 in which said derivative is 14α,17α-(p-methylbenzylidenedioxy)progesterone.

50. A 14α,17α-methylenedioxypregnane derivative according to claim 1 in which said derivative is 14α,17α-(p-isopropylbenzylidenedioxy)progesterone.

51. A 14α,17α-methylenedioxypregnane derivative according to claim 1 in which said derivative is 14α,17α-(p-methoxybenzylidenedioxy)progesterone.

52. A 14α,17α-methylenedioxypregnane derivative according to claim 1 in which said derivative is 11α-hydroxy-14α,17α-(p-methoxybenzylidenedioxy)progesterone.

53. A 14α,17α-methylenedioxypregnane derivative according to claim 1 in which said derivative is 14α,17α-(p-nitrobenzylidenedioxy)progesterone.

54. A 14α,17α-methylenedioxypregnane derivative according to claim 1 in which said derivative is 14α,17α-(p-aminobenzylidenedioxy)progesterone.

55. A 14α,17α-methylenedioxypregnane derivative according to claim 1 in which said derivative is 14α,17α-(3',4',5'-trimethoxybenzylidenedioxy)progesterone.

56. A 14α,17α-methylenedioxypregnane derivative according to claim 1, wherein R is methoxy or ethoxy.

57. A 14α,17α-methylenedioxypregnane derivative according to claim 1 in which said derivative is 14α,17α-methoxymethylenedioxyprogesterone.

58. A 14α,17α-methylenedioxypregnane derivative according to claim 1 in which said derivative is 3-methoxy-14α,17α-methoxymethylenedioxy-3,5-pregnadien-20-one.

59. A 14α,17α-methylenedioxypregnane derivative according to claim 1 in which said derivative is 14α,17α-ethoxymethylenedioxyprogesterone.

60. A 14α,17α-methylenedioxypregnane derivative according to claim 1 in which said derivative is 3-ethoxy-14α,17α-ethoxymethylenedioxy-3,5-pregnadien-20-one.

61. A 14α,17α-methylenedioxypregnane derivative according to claim 1, wherein R is selected from the group consisting of ethenyl, propenyl, phenylethyl-2, phenylethyl-1, naphthyl-1, cyclohexyl, and furanyl.

62. A 14α,17α-methylenedioxypregnane derivative according to claim 1 in which said derivative is 14α,17α-(2'-propenylidenedioxy)progesterone.

63. A 14α,17α-methylenedioxypregnane derivative according to claim 1 in which said derivative is 14α,17α-(2'-butenylidenedioxy)progesterone.

64. A 14α,17α-methylenedioxypregnane derivative according to claim 1 in which said derivative is 14α,17α-(3'-phenylpropylidenedioxy)progesterone.

65. A 14α,17α-methylenedioxypregnane derivative according to claim 1 in which said derivative is 14α,17α-(2'-phenylpropylidenedioxy)progesterone.

66. A 14α,17α-methylenedioxypregnane derivative according to claim 1 in which said derivative is 14α,17α-(1'-naphthylmethylenedioxy)progesterone.

67. A 14α,17α-methylenedioxypregnane derivative according to claim 1 in which said derivative is 14α,17α-cyclohexylmethylenedioxyprogesterone.

68. A 14α,17α-methylenedioxypregnane derivative according to claim 1 in which said derivative is 14α,17α-furfurylidenedioxyprogresterone.

69. Process for the preparation of a 14α,17α-methylenedioxypregnane derivative as claimed in claim 1, which comprises reacting a 14α,17α-dihydroxypregnane derivative of the formula

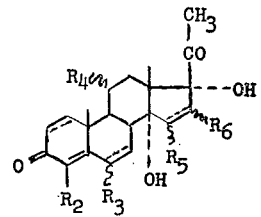

with a member of the group consisting of an aldehyde of the formula RCHO, and an acetal of the formula $RCH(OR_8)_2$ wherein in each of said formulas, each of R, $R_1$, $R_2$, $R_3$, $R_4$, $R_5$ and $R_6$ are as defined in claim 1, and $R_8$ is a lower alkyl.

70. Process for the preparation of a 14α,17α-methylenedioxypregnane derivative as claimed in claim 1, which comprises reacting a 14α,17α-dihydroxypregnane derivative of the formula

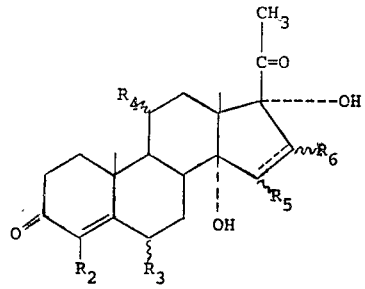

wherein each of R, $R_1$, $R_2$, $R_3$, $R_4$, $R_5$ and $R_6$ are as defined in claim 1, with an orthoformate of the formula $(R_1O)_3CH$, wherein $R_1$ is as defined in claim 1.

71. A 14α,17α-methylenedioxypregnane derivative according to claim 1 in which said derivative is 6α-chloro-14α,17α-ethylidenedioxy-progesterone or 6β-chloro-14α,17α-ethylidenedioxy-progesterone.

No references cited.

HENRY A. FRENCH, Primary Examiner

U.S. Cl. X.R.

195—51; 260—397.45, 999